US007185366B2

(12) United States Patent
Mukai et al.

(10) Patent No.: US 7,185,366 B2
(45) Date of Patent: Feb. 27, 2007

(54) SECURITY ADMINISTRATION SERVER AND ITS HOST SERVER

(75) Inventors: Toru Mukai, Tokyo (JP); Akira Ishida, Tokyo (JP); Masahiro Adachi, Tokyo (JP); Hideki Koike, Tokyo (JP); Tetsuji Takada, Tokyo (JP); Eiji Tameda, Tokyo (JP)

(73) Assignee: Seer Insight Security Inc., Tokyo (JP)

( * ) Notice: Subject to any disclaimer, the term of this patent is extended or adjusted under 35 U.S.C. 154(b) by 883 days.

(21) Appl. No.: 10/084,238

(22) Filed: Feb. 27, 2002

(65) Prior Publication Data

US 2002/0178382 A1 Nov. 28, 2002

(30) Foreign Application Priority Data

Mar. 2, 2001 (JP) .............................. 2001-058736
Jun. 5, 2001 (JP) .............................. 2001-169326

(51) Int. Cl.
*G06F 11/00* (2006.01)
*G06F 11/22* (2006.01)
*G06F 11/30* (2006.01)
*G06F 11/32* (2006.01)
*G06F 11/34* (2006.01)
*G06F 11/36* (2006.01)
*G06F 12/14* (2006.01)

(52) U.S. Cl. .................... 726/23; 726/2; 726/3; 726/13; 713/153; 713/160

(58) Field of Classification Search ................. 726/23, 726/3
See application file for complete search history.

(56) References Cited

U.S. PATENT DOCUMENTS

| 6,006,328 | A * | 12/1999 | Drake ........................... 726/23 |
| 6,681,331 | B1 * | 1/2004 | Munson et al. ................ 726/23 |
| 6,711,127 | B1 * | 3/2004 | Gorman et al. .............. 370/230 |
| 2002/0066034 | A1 * | 5/2002 | Schlossberg et al. ....... 713/201 |
| 2004/0143756 | A1 * | 7/2004 | Munson et al. .............. 713/200 |

OTHER PUBLICATIONS

NIGELOG: Protecting Logging Information by Hiding Multiple Backups in Directories; in proceeding of Tenth International Workshop on Database and Expert Systems Applications (DEXA99); IEEE CS Press, p. 874-878.

(Continued)

*Primary Examiner*—Kambiz Zand
*Assistant Examiner*—Samson Lemma
(74) *Attorney, Agent, or Firm*—Harness, Dickey & Pierce PLC

(57) ABSTRACT

A security administration server providing various security services in the LAN and a host server operating in connection thereto are provided. There is installed a security administration server (S) having a function for collecting various log information managed in various devices to be monitored (C) operating in the LAN, a function for generating an image by extracting information useful for security management of the LAN from collected log information and visualizing such information to a form easy for a person to use, and a function for sending the image to another monitoring device (C). Further, the security administration server (S) provides various security services in connection with a host server (H) operating in an external network.

49 Claims, 21 Drawing Sheets

OTHER PUBLICATIONS

Tudumi: Log Information Visualization System for Intrusion Detection; Technical Report, UEC-IS-TR-2000-08; Graduate School of Information Systems, University of Electro-Communications; Sep. 2000.

A Remote Network Monitoring System Using Mobile Phone; Kazunao Wakai and Hideki Koike; Graduate School of Information systems; University of Electro-Communications; p. 1-6.

* cited by examiner

| DEVICE TO BE MONITORED | DISPLAY METHOD OF LAYERS (GROUP CLASSIFICATION) | | | | DISPLAY TIME | | | OPERATION OF DISPLAY ANGLE | |
|---|---|---|---|---|---|---|---|---|---|
| | FOR EACH DOMAIN | FOR EACH DEPARTMENT | FOR EACH BUILDING FLOOR | FOR EACH ACCESS TYPE | REAL TIME | PLAYBACK | DEFAULT | ARBITRARY | |
| 1 PERSONAL COMPUTER | | | | | ○ | | | ○ | |
| 2 DATA BASE SERVER | | | ○ | ○ | ○ | | | ○ | |
| 3 WEB SERVER | ○ | | | | ○ | | ○ | | |
| 4 MAIL SERVER | | ○ | | | | ○ | ○ | | |
| 5 | | | | | | | | | |
| 6 | | | | | | | | | |
| 7 | | | | | | | | | |
| 8 | | | | | | | | | |
| 9 | | | | | | | | | |
| 10 | | | | | | | | | |

| SETTING ENVIRONMENT | OS | | | | DHCP ENVIRONMENT | | LOG COLLECTION TIME | | |
|---|---|---|---|---|---|---|---|---|---|
| | unix | unix | unix | Windows | OPEN | SEER DHCP | 5 MINS. | ARBITRARY | |
| 1 PERSONAL COMPUTER | ○ | | | | | | ○ | | |
| 2 DATA BASE SERVER | ○ | | | | | | ○ | | |
| 3 WEB SERVER | | | ○ | | ○ | ○ | ○ | | |
| 4 MAIL SERVER | | | ○ | | ○ | ○ | | 240MINS | |
| 5 | | | | | | | | | |
| 6 | | | | | | | | | |
| 7 | | | | | | | | | |
| 8 | | | | | | | | | |
| 9 | | | | | | | | | |
| 10 | | | | | | | | | |

FIG. 4

```
Jun 25 01:01:05 comp1 syslogd: restart
Jun 25 02:25:56 comp1 ftpd[28855]: connection from kawa.yama.uec.ac.jp
Jun 25 02:25:56 comp1 ftpd[28855]: FTP LOGIN FROM kawa.yama.uec.ac.jp as manA
Jun 25 03:00:05 comp1 fsr[28297]: no rw els file systems in mtab
Jun 25 03:00:05 comp1 fsr[29374]: fsr_xfs -m /etc/mtab -t 7200 -f /var/tmp/.
Jun 25 03:30:39 comp1 Xsession: manA: login
Jun 25 05:18:03 comp1 ftpd[29785]: connection from kawa.yama.uec.ac.jp
Jun 25 05:18:03 comp1 ftpd[29785]: FTP LOGIN FROM kawa.yama.uec.ac.jp as manA
Jun 25 05:27:52 comp1 Xsession: manA: logout
Jun 25 19:48:15 comp1 login[31071]: ?@mura.yama.uec.ac.jp as cynthia
Jun 25 21:13:25 comp1 Xsession: manA: login
Jun 25 21:14:16 comp1 nix: WARNING: ARP: got MAC address
Jun 25 21:30:43 comp1 Xsession: manA: logout
Jun 25 03:42:18 comp1 ftpd[31806]: connection from kawa.yama.uec.ac.jp
Jun 25 03:42:18 comp1 ftpd[31806]: FTP LOGIN FROM kawa.yama.uec.ac.jp as manA
Jun 25 01:01:05 comp1 syslogd: restart
Jun 25 02:25:56 comp1 ftpd[28855]: connection from kawa.yama.uec.ac.jp
Jun 25 02:25:56 comp1 ftpd[28855]: FTP LOGIN FROM kawa.yama.uec.ac.jp as manA
Jun 25 03:00:05 comp1 fsr[29374]: fsr_xfs -m /etc/mtab -t 7200 -f /var/tmp/.
Jun 25 03:30:39 comp1 Xsession: manA: login
Jun 25 05:18:03 comp1 ftpd[29785]: connection from kawa.yama.uec.ac.jp
Jun 25 05:18:03 comp1 ftpd[29785]: FTP LOGIN FROM kawa.yama.uec.ac.jp as manA
Jun 25 05:27:52 comp1 Xsession: manA: logout
Jun 25 19:48:15 comp1 login[31071]: ?@mura.yama.uec.ac.jp as cynthia
Jun 25 21:13:25 comp1 Xsession: manA: login
Jun 25 21:14:16 comp1 unix: WARNING: ARP: got MAC address
Jun 25 21:30:43 comp1 Xsession: manA: logout
Jun 25 03:42:18 comp1 ftpd[31806]: connection from kawa.yama.uec.ac.jp
Jun 25 03:42:18 comp1 ftpd[31806]: FTP LOGIN FROM kawa.yama.uec.ac.jp as manA
```

- RED BACKGROUND COLOR: KEYWORD BY PATTERN MATCHING
- BLUE BACKGROUND COLOR: KEYWORD BASED ON APPEARANCE FREQUENCY

FIG. 5

| XXX CORPORATION | | CSO :TORU MUKAI | | SYSTEM ADMINISTRATOR: MASAHIRO ADACHI | | | |
|---|---|---|---|---|---|---|---|
| COMPUTER TO BE MONITORED | SPECIFICATION | SERVICE CONTENT | | | | | |
| | OS/CPU | BASIC FUNCTION | 3D VISUALIZATION | REMOTE MONITORING | LOG CONCEALMENT | | |
| 1 DBS SERVER 1 | Solar | O | O | O | O | | |
| 2 DBS SERVER 2 | Solar | O | O | O | O | | |
| 3 Web SERVER | Linux/ 1C | O | O | O | O | | |
| 4 MAIL SERVER | Linux/ 1C | - | O | O | O | | |
| 5 RAS Gateway | Solar | - | O | - | O | | |
| 6 | | | | | | | |
| 7 | | | | | | | |

| ● OPERATING STATE OF ADMINISTRATION SERVER | | | | | | | |
|---|---|---|---|---|---|---|---|
| OPERATING STATE | INSTALLMENT PLACE | COMPUTER TO BE ADMINISTERED | | | | | |
| | | 1 | 2 | 3 | 4 | 5 | |
| 1 NORMAL | PRESIDENT'S ROOM | DBS SERVER 1 | DBS SERVER 2 | Web SERVER | MAIL SERVER | | |
| 2 NORMAL | INFORMATION ADMINISTRATION ROOM | REMOTE GATEWAY | | | | | |
| 3 | | | | | | | |
| 4 | | | | | | | |
| 5 | | | | | | | |

FIG. 6

DATA FORMAT OF PACKET INFORMATION FILE

| FIELD NAME | DESCRIPTION |
| --- | --- |
| time | COLLECTION TIME (SERVER TIME) |
| btFlags | 0:IN<br>1:OUT (FROM SERVER)<br>2:SMB (SUCH AS COMMON FILE ACCESS) |
| wLength | ORIGINAL LENGTH OF PACKET |
| mwMac | CLIENT MAC ADDRESS |
| dwIPAddr | CLIENT IP ADDRESS |
| wPort | SERVER PORT NUMBER |
| btDataLength | LENGTH OF PORTION OF VARIABLE DATA OF PACKET (0 TO 255) |
| btData[256] | VARIABLE DATA OF 256 PACKETS (VARIABLE LENGTH) |

FIG. 12

BADIC VISUALIZATION DATA

| FIELD NAME | DESCRIPTION |
| --- | --- |
| time | COLLECTING TIME (TIME AT SECURITY ADMINSTRATION SERVER) |
| wServerID | IDENTIFIER OF SERVER TO BE MONITORED |
| wType | TYPE OF PACKET (01:Login...65:Mail...) |
| mwMac | CLIENT MAC ADDRESS |
| dwIPAddr | CLIENT IP ADDRESS |
| wOriginalLength | ORIGINAL LENGTH OF PACKET |
| btData[256] | CHARACTER DATA FOR EACH TYPE OF 256 PACKETS (Login:UserID/Mail:from.to...) |

FIG. 13

SECURITY ADMINISTRATION SERVER AND ITS HOST SERVER

FIELD OF THE INVENTION

The present invention relates, to a security administration server installed in a LAN connected to an external network such as the Internet, for providing a security service in such LAN, and to a host server operating in connection with the security administration server, and also relates to a technique for providing various services useful for security management in a LAN.

BACKGROUND ART

In general, a so-called LAN which is structured closed in an organization such as a company, is frequently operated in a form connected to external networks such as the Internet, since it is necessary to make web pages public for the purpose of exchanging electronic mails, publicity and advertisement, and electronic commercial transactions. The security management of the LAN operated in this form is usually performed by device of router setting or constructing a firewall.

However, for example, in such as a case that access has to be permitted to an employee who is out of the office to an in-house computer, security is the other side of convenience, and with just the router setting or a firewall, unauthorized entry from an external network cannot be completely prevented. Further, the above security is powerless against unjust acts of so called an "insider."

On the other hand, as is well-known, history information stored and managed in various devices in the LAN, so called log information, are often used for security management. Since log information includes a lot of information useful for security management, such as access history from external networks, by researching and analyzing such information, for example, how an unjust act was performed, what the target was, where the intruder came from, which is the damaged file or data, may be grasped in detail. Thus, the log information is extremely effective in conducting a tracing investigation performed after an unjust act.

However, in general, information included in the log information is large, and a considerable amount of labor is needed for analysis work of such information. Further, in order to analyze such information and extract useful information, it requires such appropriate techniques and experience, and there are many cases where even if useful information is included it is not sufficiently utilized. Furthermore, when many devices are operating in the LAN, it is extremely troublesome to collect necessary log information from each of the devices.

On the other hand, monitoring of unjust acts or tracing investigation, may be performed by utilizing not only log information but also communication packets flowing in the LAN. Generally, the number of communication packets flowing in the LAN is huge, and when performing such as monitoring of unjust acts utilizing communication packets, such appropriate skill or knowledge is required.

SUMMARY OF THE INVENTION

This invention is made in view of the above problems, and an object is to provide a server apparatus providing the security service, which provides information useful for security management of devices to be monitored which may be obtained from log information or communication packets, in a form easy for users to use, and a host server which operated in connection with the server apparatus.

According to an invention as claimed in claim 1 of the present invention for achieving the object, is a security administration server installed in a predetermined LAN, comprising:

means for collecting information relating to communication conducted via the LAN by a device to be monitored operating in the LAN;

means for generating an image by extracting information useful for security management in the LAN from the collected communication related information and visualizing the information to a predetermined form; and means for sending the image to a monitoring device.

Another invention of the present invention is a security administration server, comprising means for detecting an abnormality in security of the device to be monitored based on the communication related information, and means for reflecting to the image when such abnormality is detected of such fact and/or its content.

Another invention of the present invention is a security administration server, comprising means for collecting a log information via the LAN, wherein the communication related information is a log information stored and managed in the device to be monitored.

Another invention of the present invention is a security administration server, wherein:

the LAN is connected to an external network such as the Internet; and the image generating means comprises means for generating an image visualizing into respective predetermined objects, the device to be monitored, a device operating in the external network which communicates with the device to be monitored, a user using the devices, and communication conducted between each device inside and outside of the LAN.

Another invention of the present invention is a security administration server, wherein:

the image generating means comprises means for dividing in groups each of the objects according to a predetermined standard, and for generating an image visualizing each group in layers.

Another invention of the present invention is a security administration server, wherein the standard is based on reliability between each device and the LAN.

Another invention of the present invention is a security administration server, wherein:

the image generating means comprises a function for generating an image structured with an area displaying a text message as it is, an area displaying as a graph an appearance frequency of a predetermined character string in the log information, an area displaying as a graph an appearance frequency of the character string for each predetermined unit time period in a time series, and an area displaying as a graph the length of each line of the text message, based on a log information structured with describing various processes conducted in each of the devices to be monitored in a text message format including such content and execution time and date in separate lines.

Another invention of the present invention is a security administration server, wherein:

the device to be monitored comprises means for managing a log file which is the entity of the log information in the form of an original file and a plurality of duplicate files thereof managed with the same contents as the original file in real time, and for storing and managing each file distributed to a plurality of storing places suitably defined in a storing means in the device to be monitored, means for suitably transferring each duplicate file to another the storing place, means for detecting whether or not there is an abnormality in security in both of the original and duplicate log files, and means for notifying the security administration server when an abnormality is detected of such fact and/or its content, wherein the image generating means comprises means for reflecting in the image a fact and/or its content of detecting the abnormality notified from the device to be monitored.

Another invention of the present invention is a security administration server, comprising:

means for receiving an updating data sent from a predetermined computer operating in the external network; and means for updating a content of a software providing the image generating means by the updating data.

Another invention of the present invention is a security administration server, comprising means for transmitting and receiving the collected log information to and from the computer by communicating with the predetermined computer operating in the external network.

Another invention of the present invention is a security administration server comprising:

means for storing and managing various setting-registration information such as information of the device to be monitored from which the log information is collected, and information used and/or referred to by the image generating means; and means for transmitting and receiving the setting-registration information to and from the computer by communicating with the predetermined computer operating in the external network.

Another invention of the present invention is a security administration server comprising:

means for detecting an abnormality in security of the device to be monitored or the security administration server itself, by communicating with a predetermined computer operating in the external network, based on the collected log information and log information of the security administration server stored and managed by itself; and means for transmitting and receiving to and from the computer when an abnormality is detected of such fact and/or its content.

Another invention of the present invention is a security administration server comprising:

means for communicating based on a TCP/IP protocol with each device to be monitored;

means for allocating predetermined IP addresses according to a request from each device to be monitored in the LAN as well as for storing and managing allocated histories describing histories of corresponding the IP addresses and MAC addresses of each device to be monitored;

means for storing and managing the collected communication related information attached with an IP address specifying which the device to be monitored the communication related information concerns;

means for handling the communication related information attached with IP addresses corresponded to a same MAC address in the allocated history, as a communication related information regarding the same the device to be monitored.

Another invention of the present invention is a security administration server comprising:

means for mutually transmitting and receive the allocated history to and from other security administration servers operating in the LAN; and means for integratedly managing the allocated history in another security administration server that is received, and the allocated history stored and managed by the server itself, and to handle the communication related information attached with IP addresses corresponded to a same MAC address in respect to these allocated histories, as a communication related information regarding the same device to be monitored.

Another invention of the present invention is a security administration server comprising means for specifying a MAC address wherein each combination of a MAC address and an IP address described corresponding to the allocated history is attached with a valid period information of the IP address, the valid period information and a generated time and date of the communication related information recorded and attached to the collected communication related information are compared, and a MAC address corresponded with an IP address attached to the communication related information at the generated time and date is specified.

Another invention of the present invention is a host server comprising means for suitably sending the updating data to the security administration server.

Another invention of the present invention is a host server comprising means for storing and managing the communication related information sent from the security administration server.

Another invention of the present invention is a host server comprising means for sending the communication related information which is stored and managed to the security administration server.

Another invention of the present invention is a host server comprising:

means for detecting an abnormality in security regarding the device to be monitored based on the communication related information which is stored and managed; and means for sending to a security administration server installed in a relevant LAN of the fact and/or its content when an abnormality is detected.

Another invention of the present invention is a host server comprising means for receiving the various setting information sent from the security administration server, or the fact and/or its content of detecting the abnormality, and for storing and managing such information.

Another invention of the present invention is a host server comprising:

means for communicating with a portable telephone via the Internet or a telephone network; and means for reporting to a predetermined portable telephone by a voice call or an electronic mail, of the fact and/or its content when the host server itself detects an abnormality, or the fact and/or its content of detecting the abnormality sent from the security administration server.

Another invention of the present invention is a host server comprising:

means for communicating with a portable telephone via the Internet;

means for receiving an inquiry message regarding the communication related information sent from a predetermined portable telephone;

means for retrieving the communication related information corresponding to the inquiry message from the communication related information which is stored and managed; and means for sending a message described with such retrieved result to the portable telephone.

Another invention of the present invention is a host server comprising:

means for communicating with a portable telephone via the Internet;

means for receiving information specifying the device to be monitored sent from a predetermined portable telephone and a processing command executed in the device;

means for sending the processing command to a device specified by the specifying information via the Internet;

means for receiving an execution result of the processing command sent from the device, for editing the execution result to an image of a form suitable for a user interface of the portable telephone, and for sending such image to the portable telephone.

Another invention of the present invention is a security administration server comprising means for collecting communication packets, wherein the communication related information is communication packets flowing in the LAN.

Another invention of the present invention is a security administration server comprising means for directly obtaining the communication packets via the LAN.

Another invention of the present invention is a security administration server comprising means for concentrating via the LAN communication packets which are obtained by the device to be monitored operating in the LAN and stored and managed in the device to be monitored.

Another invention of the present invention is a security administration server comprising:

means for calculating at least one portion of, a value of the number of the devices to be monitored or a number totaling the number of devices into predetermined groups, a number of communication packets transmitted and received by the device to be monitored via the LAN, and a number totaling such number of communication packets in predetermined groups; and means for generating an image visually expressing a value of at least one portion of each calculated value, and for sending the image to the device to be monitored which is connected to via the LAN.

Another invention of the present invention is a security administration server comprising:

means for storing and managing access-limitation information in respect to the device to be monitored;

means for monitoring unauthorized access violating the access-limitation information based on the communication packets; and means for generating an image visually expressing the effect when recognizing the unauthorized access and sending the image to the monitor device.

Another invention of the present invention is a security administration server comprising:

means for storing and managing access authorization information for each system operating in the device to be monitored;

means for monitoring unauthorized access violating the access authorization information based on the communication packets;

means for generating an image expressing the fact of when an access violating the access authorization information is recognized; and means for sending the image to the monitoring device.

Another invention of the present invention is a security administration server comprising means for generating an image by drawing an image visualizing communication conducted between each of the devices to be monitored or an access situation of a user of each device to be monitored based on the communication packets, and an access situation from each device to be monitored or a user to a database operating in each device to be monitored, as overlapping an image where an abstract design of each device operating in the LAN is disposed to a form according to an actual arrangement state of each device, and for sending the image to the monitoring device.

Another invention of the present invention is a security administration server comprising means for detecting a use history of the device to be monitored of each user using the device to be monitored based on the communication packets, and sending an image describing the use history to the monitoring device.

An invention of the present invention is a security administration server comprising:

means for totaling the number of communication packets transmitted and received to and from the device to be monitored which is examined based on the communication packets, for each system operating in the device to be monitored;

means for generating an image visualizing the totaled value for each system; and means for sending the image to the monitor device.

Another invention of the present invention is a security administration server comprising:

means for examining an operating state of the device to be monitored based on the communication packets;

means for generating an image visualizing an operating state of each device to be monitored, by classifying into each system operated by using the device to be monitored; and means for sending the image to the monitoring device.

Another invention of the present invention is a security administration server comprising:

means for detecting an access frequency to a database operated by the device to be monitored based on the communication packets;

means for generating an image visualizing by classifying for each device to be monitored or for each system operated by using the device to be monitored; and means for sending the image to the monitoring device.

Another invention of the present invention is a security administration server comprising:

means for collecting via the LAN execution histories of a program in the device to be monitored which is accumulated and recorded in the device to be monitored;

means for generating an image visualizing an execution history of a program in the device to be monitored based on the execution history; and means for sending the image to the monitoring device.

Another invention of the present invention is a security administration server installed in a LAN connected to an external network such as the Internet, comprising:

means for passively or actively collecting a log information stored and managed by a device operating in the LAN;

means for generating an image visualizing information to a predetermined form, where the information is extracted as useful for security management in the LAN from the collected log information; and means for passively or actively sending the image to another device via the LAN.

Another invention of the present invention is a security administration server comprising:

means for detecting an abnormality in security of a device operating in the LAN based on the collected log information; and means for reflecting the fact and/or its content when the abnormality is detected to the image.

Another invention of the present invention is a security administration server wherein the image generating means comprises means for generating an image visualizing as respective predetermined objects, the device operating in the LAN, a device operating in the external network communicating with the device, a user using both the devices, and communication conducted between each device inside and outside of the LAN.

Another invention of the present invention is a security administration server wherein the image generating means comprises means for dividing each object into groups according to a predetermined standard, and generate an image visualizing each group in layers.

Another invention of the present invention is a security administration server wherein the standard is based on reliability between various devices and the LAN.

Another invention of the present invention is a security administration server wherein:

the image generating means comprises a function for generating an image structured with an area displaying a text message as it is, an area displaying as a graph an appearance frequency of a predetermined character string in the log information, an area displaying as a graph an appearance frequency of the character string for each predetermined unit time period in a time series, and an area displaying as a graph the length of each line of the text message, based on a log information structured with various processes conducted in each device described in separate lines in a text message format including such content and executing time and date.

Another invention of the present invention is a security administration server wherein the device operating in the LAN comprises:

means for managing a log file which is the entity of the log information in the form of an original file and a plurality of duplicate files thereof managed with the same contents as the original file in real time, and means for storing and managing each file distributed to a plurality of storing places suitably defined in a storing means in the device, means for suitably transferring each duplicate file to another storing place, means for detecting whether or not there is an abnormality in security in both of the original and duplicate log files, and means for notifying the security administration server when an abnormality is detected of such fact or its content, wherein image generating means comprises means for reflecting in the image the fact and/or its content of detection of the abnormality notified from the device.

Another invention of the present invention is a security administration server comprising:

means for receiving an updating data sent from a predetermined computer operating in the external network; and means for updating a content of a software providing the image generating means by the updating data.

Another invention of the present invention is a security administration server comprising means for transmitting and receiving actively or passively the collected log information to and from the computer by communicating with a predetermined computer operating in the external network.

Another invention of the present invention is a security administration server comprising:

means for storing and managing various setting-registration information such as information regarding the device operating in the LAN which is to be an object of collecting the log information, and information used and referred to by the image generating means; and means for transmitting and receiving the setting-registration information actively or passively to and from the computer by communicating with a predetermined computer operating in the external network.

Another invention of the present invention is a security administration server comprising:

means for detecting an abnormality in security of the device or the security administration server itself, by communicating with a predetermined computer operating in the external network, based on the collected log information and a log information of the security administration server stored and managed by itself; and means for transmitting and receiving actively or passively to and from the computer the fact and/or its content when an abnormality is detected.

Another invention of the present invention is a security administration server comprising:

means for communicating based on a TCP/IP protocol with each device in the LAN;

means for allocating predetermined IP addresses according to a request from the device in the LAN as well as for storing and managing allocated histories describing histories of corresponding the IP addresses and MAC addresses of the devices;

means for storing and managing the collected log information by attaching an IP address specifying which device the log information concerns;

means for handling the log information attached with IP addresses corresponded to a same MAC address in the allocated history, as log information regarding the same device.

Another invention of the present invention is a security administration server comprising:

means for mutually transmitting and receive the allocated history to and from another security administration server operating in the LAN; and means for integratedly managing the received allocated history in another security administration server, and the allocated history stored and managed by itself, and for handling the log information attached with IP addresses corresponding to a same MAC address in respect to the allocated histories, as a log information regarding the same device.

Another invention of the present invention is a security administration server comprising means for specifying a MAC address wherein each combination of a MAC address and an IP address described corresponding to the allocated history is attached with a valid period information of the IP address, the valid period information and a generated time and date of the log information recorded attached to the collected log information are compared, and a MAC address corresponded with an IP address attached to the log information at the generated time and date is specified.

Another invention of the present invention is a host server functioning as the predetermined computer comprising means for suitably sending the updating data to the security administration server.

Another invention of the present invention is a host server functioning as the predetermined computer comprising means for storing and managing the log information sent from the security administration server.

Another invention of the present invention is a host server comprising means for sending actively or passively the log information which is stored and managed to the security administration server.

Another invention of the present invention is a host server comprising:

means for detecting an abnormality in security of the device in the LAN based on the log information which is stored and managed; and means for sending to a security administration server installed in a relevant LAN the fact and/or its content when an abnormality is detected.

Another invention of the present invention is a host server comprising means for actively or passively receiving the various setting information sent from the security administration server, or the fact and/or its content of detecting the abnormality, and for storing and managing such information.

Another invention of the present invention is a host server comprising:

means for communicating with a portable telephone via the Internet or a telephone network; and means for reporting to a predetermined portable telephone by a voice call or an electronic mail, the fact and/or its content when the host server itself detects an abnormality, or the fact and/or its content of detecting the abnormality sent from the security administration server.

Another invention of the present invention is a host server comprising:

means for communicating with a portable telephone via the Internet;

means for receiving an inquiry information regarding the log information sent from a predetermined portable telephone;

means for retrieving the log information corresponding to the inquiry message from the log information which is stored and managed; and means for sending a message describing the retrieved result to the portable telephone.

Another invention of the present invention is a host server comprising:

means for communicating with a portable telephone via the Internet;

means for receiving information specifying the device operating in the LAN sent from a predetermined portable telephone and a processing command executed in the device;

means for sending the processing command to a device specified by the specifying information via the Internet;

means for receiving an execution result of the processing command sent from the device, for editing the execution result to an image of a form suitable for a user interface of the portable telephone, and for sending such image to the portable telephone.

BRIEF DESCRIPTION OF THE DRAWINGS

Embodiments of the present invention will now be described by way of further example only and with reference to the accompanying drawings, in which:

FIG. 4 is a diagram showing a Web page for setting the image of FIG. 2 according to an embodiment of the present invention;

FIG. 5 is a diagram showing an image visualizing a log file according to an embodiment of the present invention;

FIG. 6 is a diagram showing a Web page of a list displaying contents of various services provided to each device in the LAN according to an embodiment of the present invention;

FIG. 12 shows a data format of a packet information file according to an embodiment of the present invention;

FIG. 13 shows a data format of a basic visualization data according to an embodiment of the present invention;

DETAILED DESCRIPTION OF PREFERRED EMBODIMENTS

Figure 1:
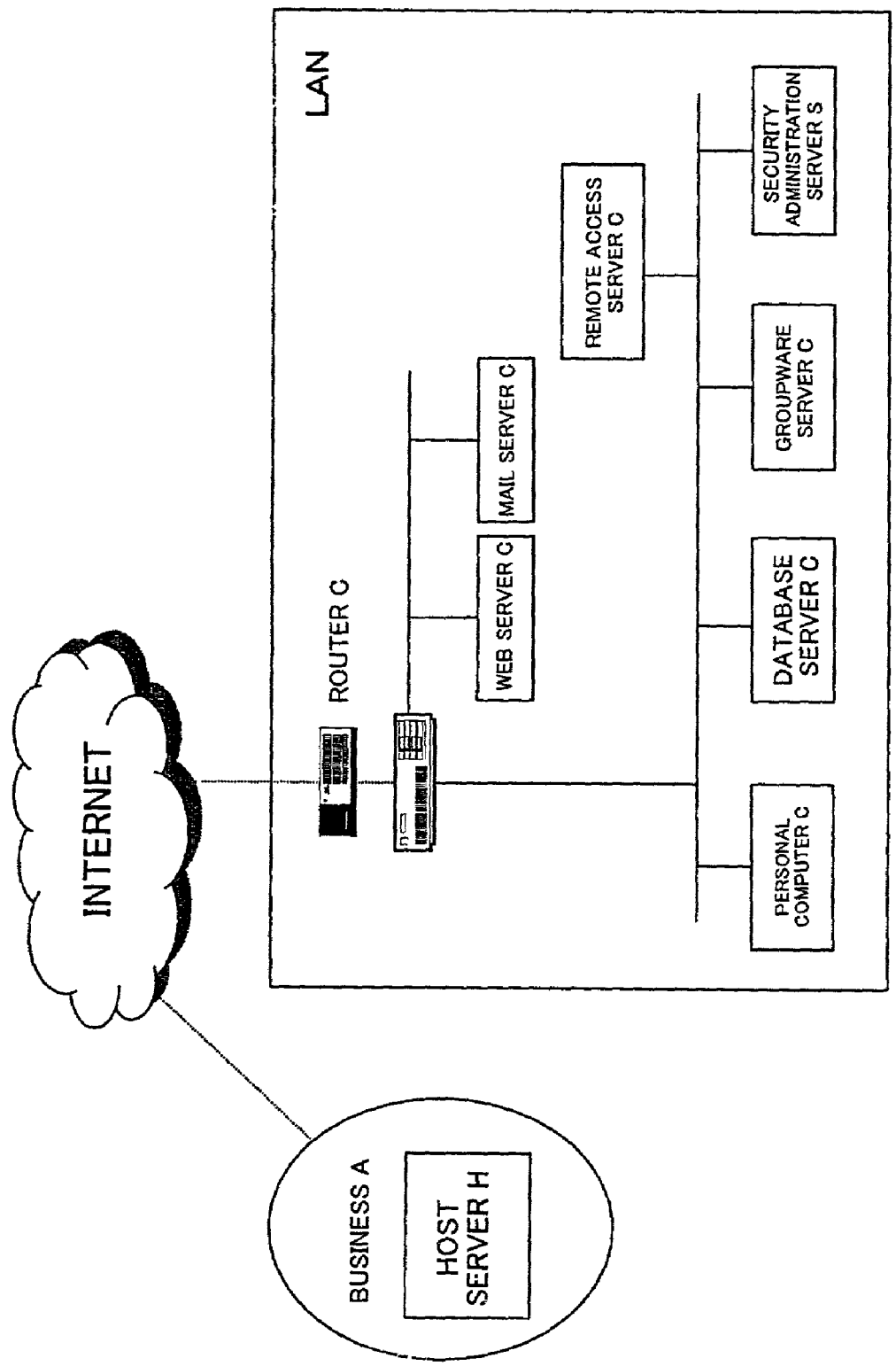
FIG. 1 is a diagram showing a schematic network structure of a LAN installed with a security administration server according to an embodiment of the present invention.

FIG. 1 is a schematic network configuration of a LAN which is installed with a security administration server S according to an embodiment of the present invention. In this LAN, TCP/IP is employed as one communication protocol, and the LAN is connected to the Internet which is an external network.

In the LAN, various devices to be monitored C which are to be objects of security management, for example, a network equipment such as a router, a firewall server, a personal computer of an individual such as a personal computer or an office computer, a web server functioning as a web server for an intranet or a web server for the Internet, a mail server for relaying electronic mails on the Internet or in the LAN and conducting user management, a DNS server, various database servers, and groupware servers, are operating.

The security administration server S is installed and operated by a predetermined business A. The business A makes a contract with an organization such as a company possessing a LAN, to install the security administration server S in the contractor's LAN, and provides various services by a host server H, described later as business.

===Function of Security Administration Server===

<Backup Service>

The security administration server S conducts a backup service, that is, the security administration server S collects various log information saved in each device C operating in the LAN, and stores and manages it. Log information refers to, for example, when an OS operating in a device to be monitored C is UNIX, a "wtmp" log file recording a log in history information, a "syslog" file recording an access history to a device to be managed, an "sulog" file recording an execution history of an "su" command which is a command for temporarily changing a user ID to a user ID with a privileged mode attribute, a "pacct" file in which execution histories of various commands are described, a file recording attribute changes of specific files, or the like.

The security administration server S is registered with such as, a specific information (for example, host name or IP address) of a device from which log information is collected, a saving area of the log information (for example, a directory name where a log file is saved or a file name of a log file), and a collection timing. These registered information are registered or updated by utilizing such as a web page for registration provided by the security administration server S.

The security administration server S stores and manages the collected log information in a hard disk or the like. The log information is used for various processes to be described later, as well as, for example, in case of a tracing investigation when there is such as an unauthorized access or when a log file is tampered, deleted and the like, the log information is used as their backup files.

<Visualization of Log Information>

Figure 2:
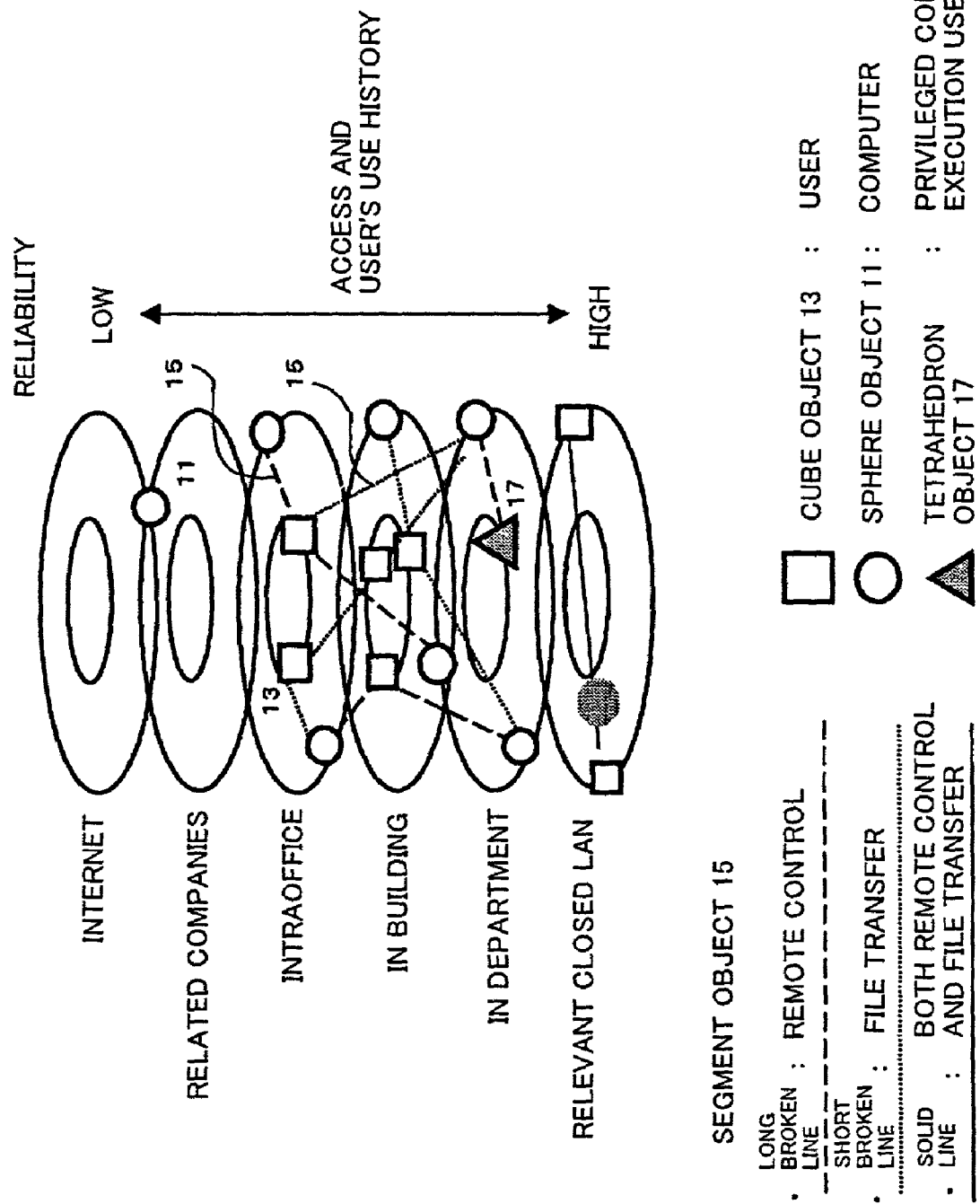
FIG. 2 is a diagram showing an example of an image generated by a security administration server according to an embodiment of the present invention.
Figure 3:
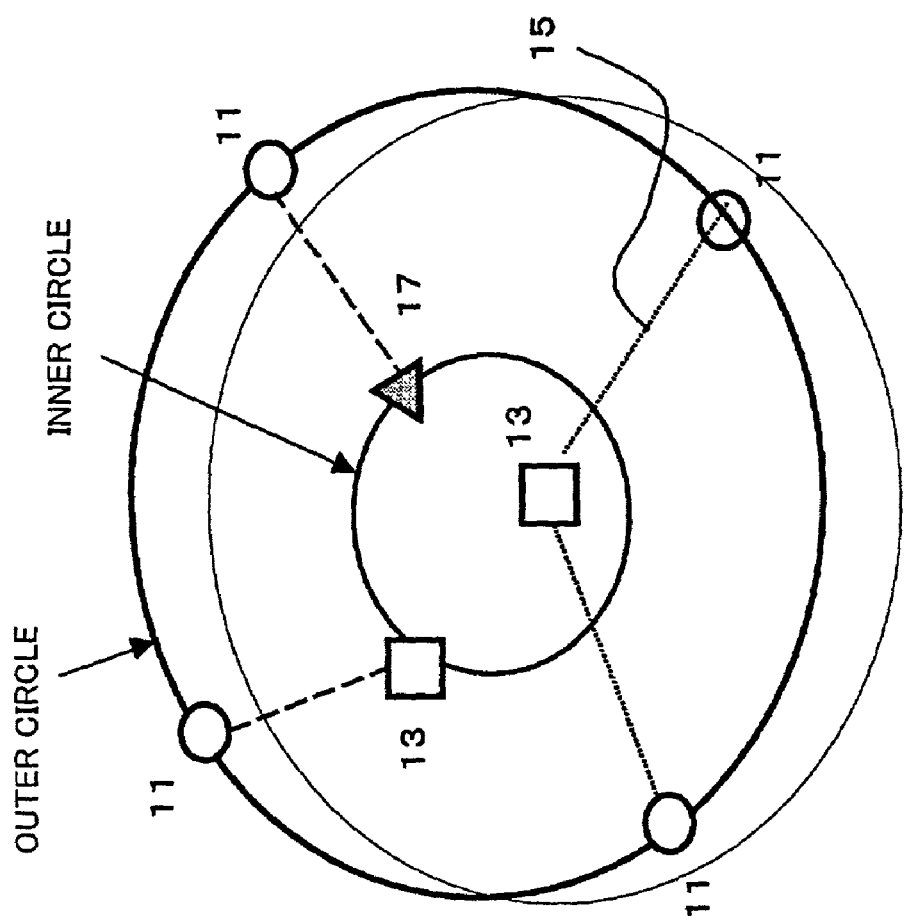
FIG. 3 is a diagram showing a partially enlarged view of the image in FIG. 2.

The security administration server S extracts information useful for security management of the LAN from the collected log information, and generates an image visualizing such information to a form easy for a person to use. FIG. 2 is an example of a visualized image, and various devices to be monitored C operating in the LAN, a device outside of the LAN accessing the devices C, a user accessing the devices inside and outside of the LAN, and the communication between these devices are three-dimensionally visualized as predetermined objects, respectively.

In this figure, an outer circle shows a network divided by a predetermined concept, such as the LAN which is separated by such as a router, and on this outer circle are drawn sphere objects 11 representing devices existing in this network. On the other hand, in the inner circle portion drawn at the inner side of each outer circle, are drawn cube objects 13 representing users using the devices within the network.

In this figure, a segment object 15 connecting the sphere object 11 and the cube object 13, shows that the device represented by the sphere object 11 is using a user account (user ID) represented by the cube object 13 (The user account is logging in.). The kind of the segment object 15 (dotted line, solid line, and the like) shows the form of communication, for example, a communication for remote operation, a communication for file transfer, or an access for both above processes. Note that, the segment object 15 may be attached with, for example, a command executed in this communication or the like.

In FIG. 2, a plurality of networks are suitably divided into groups according to classified reliabilities. In this figure, the LAN in which the security administration server S is installed is represented as the lowest layer (that is, it is most reliable), and as the relationship of other networks with this LAN drifts apart (as reliability decreases), it is shown higher, and the highest layer shows the Internet.

When the security administration server S receives a request to send the image from the device to be monitored C operating in the LAN, the image is sent to the device to be monitored C as an image data of a predetermined format. That is, the image may be suitably referred to from a monitoring device C such as a personal computer of an individual operating in the LAN (there is also a case where the monitoring device C is a device to be monitored C at the same time), by using a web browser, a dedicated tool, or the like. Note that, for safety's sake, the security administration server S suitably conducts an authorization process at the time of providing the image. Further, at the time of referring, the viewpoint of the image in FIG. 2 may, for example, be moved by a user interface such as a mouse. Further, there is also included a function to display only a specific kind of object (a filter function), and it is possible, for example, to show only devices which are executing some process, or to display only devices which are being accessed from devices of an external network.

Note that, of course the form of FIG. 2 is only one example, and the forms of such as, shape, color and pattern of each object, and the classification of layers, may be freely customized by an administrator, a user and the like, by using, for example, a web page for settings as shown in FIG. 4, provided by the security administration server S.

The image which the security administration server S provides to the device to be monitored C in the LAN, is not limited to necessarily a real-time image. The security administration server S stores and manages images of the past, and the administrator or the user may suitably refer to images at a certain time or a certain period in the past, and for example, may show advantages in tracing investigations when there is an abnormality such as an unauthorized entry.

<Display of Log File>

Incidentally, in general, log information is frequently managed in a log file structured with text messages including the content and the execution date and time of various processes executed by the device written in separate lines. This log file usually includes a huge amount of text messages, and if this is to be analyzed as is, an incredible amount of labor will be required. Further, analyzing a log file requires such appropriate technique. The function of a security administration server described here, is a function of displaying a log file in a form easy for people to use, so that an analysis of a log file with such a format may be easily conducted.

FIG. 5 is one such example. In area 21, at the left most side, there is shown an appearance frequency of predetermined keywords included in this log file. The keyword is set with a suitable content by such as business A or an administrator of the LAN, and, for example, a command which tends to be used for unjust acts ("su" command) or the like is set.

In area 22 there are shown output frequencies of text messages for every predetermined unit period in a time series as a sideways bar graph. The length of the bar graph extends as more messages are output in a short time. Note that, the time interval may be set as all sorts of scales such as a unit of months, weeks, days, and the like.

In area 23, the length of each text message is shown as a sideways bar graph. Each bar graph has a different color according to every kind of message.

The bar graphs shown in areas 22 and 23 are preferable for intuitively grasping, for example, the message length and the periodicity or the irregularity of the message output frequency, and may be an extremely effective information for discovering unjust acts attempted periodically or randomly.

Note that, the display contents of areas 21 to 23 in the image are generated by, for example, converting a log file to a suitable format for applying a text mining technique (a converting process), applying a text mining technique in respect to a converted log file, extracting information such as the appearance frequency of each keyword for each time as described above (an extracting process), and creating a graph thereof.

In area 24, at the right most side, are displayed the text messages written in the log file as is. Further, in order to more easily find an unjust event such as an unjust act, a designated keyword (for example, "su" command) is displayed with emphasis by a predetermined color, and a keyword with a high appearance frequency is displayed with emphasis by a different color to the predetermined color.

<Function to Detect Abnormality>

The security administration server S conducts various analysis algorithms, with log information collected from the device C, or self log information that the security administration server S itself stores and manages, as the object. The security administration server S monitors in real time, various security abnormalities such as, whether or not there was such as an access from a suspicious device of an external network to the device to be monitored C in the LAN or to itself, whether there is no trace of repeated suspicious log-in processes to the device to be monitored C or to itself, or whether there is no trace of such as execution of a switching command to a privileged user by a suspicious user in the device to be monitored C or in the security administration server S, or tampering or deletion of system files and the like. When the security administration server S detects an abnormality by the monitoring, such effect and such content are reflected in, for example, the above described image of FIG. 2. For example, when a user who is remotely logged in to a certain device to be monitored C or to the security administration server S performs a suspicious operation such as entering an "su" command, a sphere object 11 showing such user changes to a tetrahedron object 17, and a segment object 15 which connects to the device to which the user has conducted a suspicious operation is displayed with emphasis by such as a dotted line or a color change.

Further, the security administration server S also has a function to send an electronic mail stating that an abnormality has been detected and such content, to a mail address of the administrator of the LAN or the user who are registered in advance in this server S. Further, such as the administrator or the user may register such as conditions and time of sending electronic mails in the security administration server S, and the security administration server S may send electronic mails according to the registered conditions.

<Providing Information Relating to Log Concealing Process>

Since log information is important information in security management, it is not unusual for the log information itself to become a target of unjust acts. Thus, the business A, as a protective means of unjust acts in respect to the log information itself, may provide software which performs a concealing process of the log information by the following means, in respect to the device to be monitored C operating in the LAN installed with the security administration server S.

A first function that this software provides, is to manage a log file which is the entity of the log information in the form of an original file and a plurality of duplicate files thereof managed in real time with the same content as the original file, and to distribute these files to the plurality of storing areas (for example, concepts such as namely "folder" and "directory") which are defined in each device to be monitored C, and to store these files. According to this function, for example, even if an unjust act such as alteration and deletion in respect to a certain log file is conducted, restoration of the log file may be conducted.

Further, the software has as a second function to transfer each duplicate file to other storing areas in the device to be monitored C at a suitable timing. As a result, it becomes difficult for such as an unjust intruder to specify the saving area of the duplicate files, and thus security will be improved.

Further, the software has as a third function of comparing both original and duplicate log files at an appropriate timing to monitor whether or not there are any abnormalities of security, and has a function of notifying the security administration server S of such effect and such content when an abnormality is detected by the monitoring. When the security administration server S is notified as above from a certain device to be monitored C in the LAN, such effect or such content is, for example, expressed as a predetermined object, and reflected in such as an image in FIG. 2. Note that, the security administration server S sends to the host server H of the effect of detecting the abnormality and such content, and this information is used for monitoring of the LAN in the host server H described later.

<Function for Management>

As shown in FIG. 6, the security administration server S provides a web page showing a list of the contents of various services provided to each device to be monitored C in the LAN, for the convenience of management by the administrator of the LAN and the user. Further, for the convenience when a plurality of security administration servers S are installed in one organization, the operating situation of each security administration server S installed in the organization are displayed in a list at the bottom half of this web page.

<Function Relating to DHCP>

The log information stored and managed by the security administration server S is usually attached with an IP address of a device to be monitored C, which is used for specifying (discriminating) which device to be monitored C's log information it is. For example, a log information stating an event of a certain device to be monitored C accessing a different device to be monitored C, is attached with the IP address of one or both of the devices to be monitored C.

However, if a so-called DHCP (Dynamic Host Configuration Protocol) server is introduced in the LAN for allocating an IP address to each device to be monitored C in the LAN, there is a possibility that the IP address to be allocated to each device to be monitored C may dynamically change. For this reason, in a configuration where the device to be monitored C is specified from only the IP address, for example, problems may arise where, although the log information are collected from a same device to be monitored C, they are acknowledged as log information of different devices to be monitored C, and accesses from different devices to be monitored C are mistakenly acknowledged as accesses from the same device to be monitored C.

Figure 7:
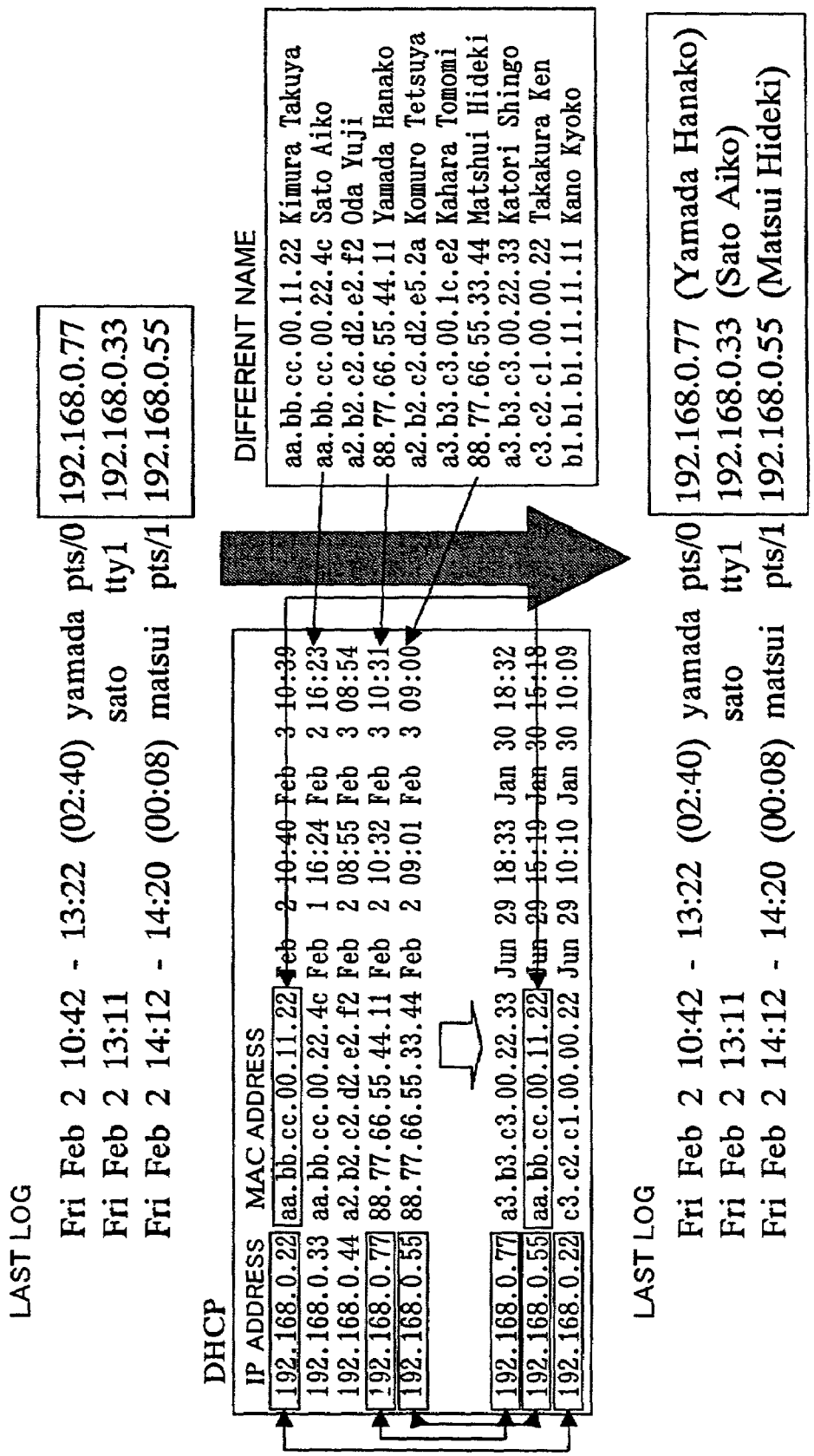
FIG. 7 is a diagram showing an example of an allocated history stored and managed in a DHCP server, and an example of a corresponding list of MAC addresses and device names (host names)

Thus, in order to solve this problem, the security administration server S comprises a structure where reference is made to a corresponding table (hereinbelow, referred to as "allocated history". An example is shown in FIG. 7.) recording successively an IP address allocated to the device to be monitored C, a MAC address of the device to be monitored C, and their valid period information, which the DHCP server stores and manages at the time of allocating the IP address, and based on this allocated history, specifies to which device to be monitored C each log information which is stored and managed belongs to.

Specifically, for example, the security administration server S retrieves the MAC address corresponded to the IP address attached to each log information from the allocated histories in respect to each log information, as a result, attaches the same device name (host name) to the log information corresponded with the same MAC address, and stores and manages the log information corresponded with the same MAC address as a log information from the same device to be monitored C.

Note that, as an application form of a DHCP server, there may be considered all sorts of forms such as a case of operating in a hardware which is separate from the security administration server S, and a case of operating by being combined in the security administration server S as a hardware or a software. In the former case, that is, in a case the DHCP server operates in a hardware which is separate from the security administration server S, a structure where the security administration server S obtains the allocated history becomes necessary, and such structure is implemented, for example, by a suitable communication between the DHCP server and the security administration server S.

Further, in a case a plurality of DHCP servers are operating in the LAN, the same IP address may be allocated to different devices to be monitored C, but in such a case different MAC addresses corresponded to the same IP address are mixed in the allocated history, and thus the MAC address cannot be specified from the IP address. In such a case, the security administration server S compares the valid period information attached and recorded to a combination of each MAC address and IP address of the allocated history, and the time and date that each log information is generated (this information, for example, may be recorded in the log information itself, or may be compulsorily attached when the security administration server S collects the log information), then specifies the MAC address to which the IP address attached to this log information at the generated time and date is corresponded to.

Figure 8:
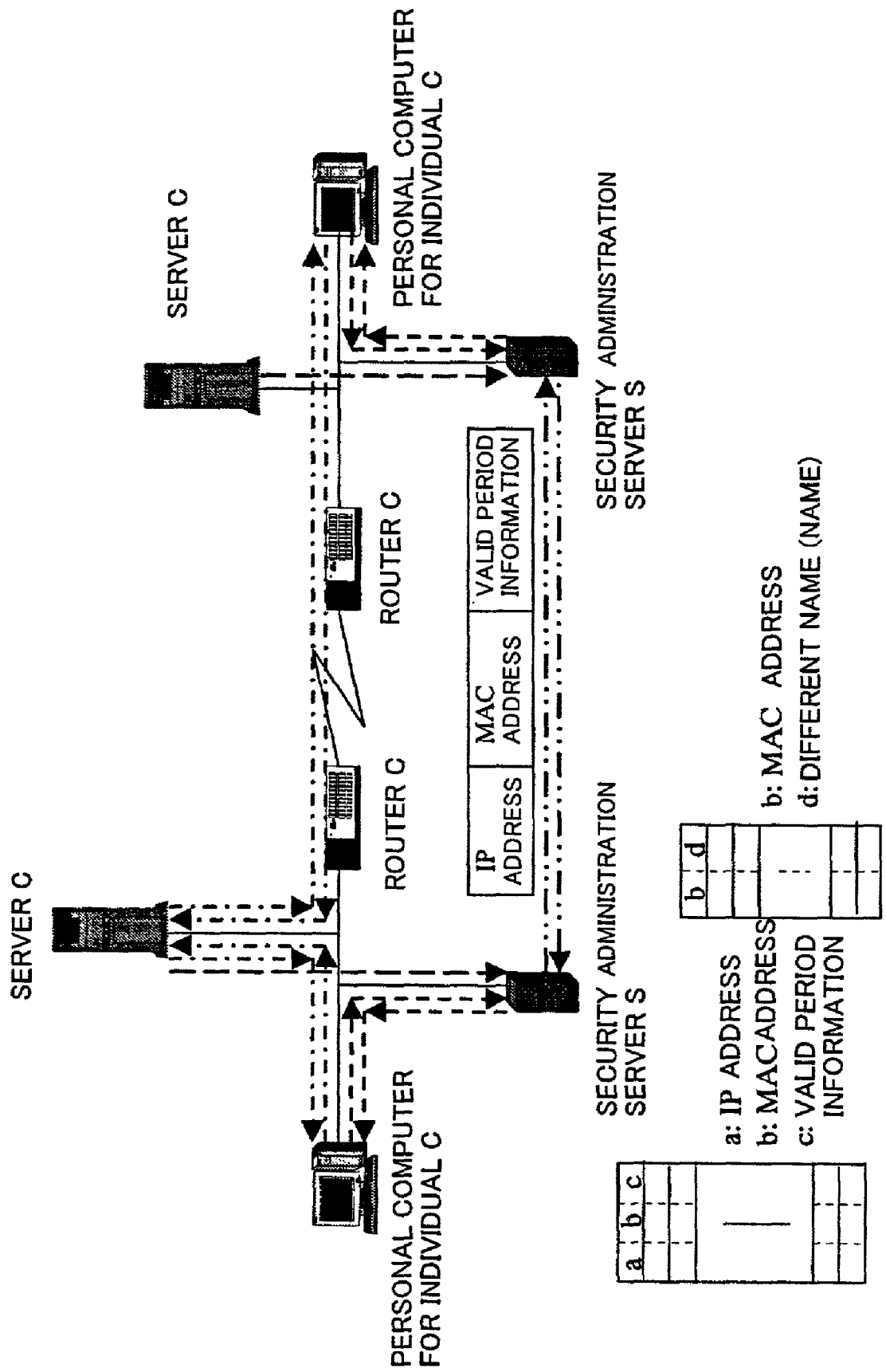
FIG. 8 is a schematic diagram showing a condition of exchanging the allocated histories between respective security administration servers, in a case a plurality of security administration servers are installed in the LAN.

Further, as shown in FIG. 8, a form where a plurality of security administration servers S are installed in one LAN, and each security administration servers S is combined with a DHCP server may be applied in aim to disperse the load or the like. In such a case, each security administration server S suitably exchanges the allocated history of each DHCP server which they store and manage, via the LAN. Then, each security administration server S integratedly manages the allocated history sent from other security administration servers S and the allocated history stored and managed by itself, and a log information attached with an IP address corresponded to a same MAC address in respect to these allocated history is considered as the same log information of the same device to be monitored C.

Furthermore, in a case these plurality of security administration servers S uniquely provide various functions described above such as visualization of log information, in fact it is preferable for device names (host names) of each device to be monitored C to be the same (for example, when adding a device name (host name) to a sphere object shown in FIG. 2, such device name is preferably the same for each security administration servers S). Therefore, the security administration server S also has a structure to suitably exchange, the relations of the MAC address and the device name (host name), with other security administration servers S via the LAN.

===Function of Host Server===

<Maintenance of Security Administration Server>

As shown in FIG. 1, the host server H communicates with the security administration servers S installed in each LAN, and monitors the operating states of each security administration server S via the Internet. A message is sent to the host server H notifying of the operating states, from the respective security administration servers S via the Internet.

The host server H monitors the content of this message. When some kind of abnormality is detected by this monitoring, the business A is notified of such effect by display on a monitor or the like. The business A who is notified of the abnormality, conducts maintenance, for example, by performing remote maintenance via communication means such as the Internet or a private line, or sends a service-man to the installed place, in respect to the security administration server S which notified this abnormality.

Further, the host server H suitably sends, in response to a request from the security administration server S, various softwares for additional functions (for example, an OS operating in the security administration server S, a software providing generation of above described image, and various functions) operating in the security administration server S, updating data for bug fixing and the like, in respect to each security administration server S.

<Back-Up of Log Information>

The host server H receives a log information sent from the security administration server S, and stores and manages such information as backup in storing means such as a hard disk.

Further, the host server H sends the log information that it stores and manages to the security administration server S. In this way, for example, when the log information managed by the security administration server S or the device to be monitored C operating in the LAN is damaged by such as tampering or unjust deletion, the tampered or unjustly deleted log information or the like may be restored based on the log information sent from the host server H, and further by using this a tracing investigation of a perpetrator may be performed.

<Management of Setting Information>

The security administration server S sends various setting-registration information which it is storing and managing, such as registration information suitably used and referred to when generating above described various images, set by the user when visualizing the log information, and registration information regarding the device to be monitored C from which the log information is collected, registered through the setting Web pages or the like, to the host server H.

The host server H receives these sent from the security administration server S, and stores and manages them in a predetermined storing means. These information are widely used for various maintenances of the security administration server, such as for confirming various conditions in operation such as if there is enough space in the storage area of the security administration server S, or used as back-up when the security administration server S is down.

<Detection of Abnormality>

The host server H monitors whether or not there is an abnormality in security such as unauthorized entry to the respective security administration servers S, and the respective devices to be monitored C in the LAN installed with the security administration servers. When the host server H detects some kind of abnormality by this monitoring, such effect or such content is displayed on a monitor to notify the business A. Further, the effect of detecting an abnormality and such content is notified to the security administration server S installed in the LAN where the abnormality was detected, via the Internet. When the security administration server S receives the notification, such effect and such content is, for example, reflected in the image of FIG. 2, to notify such as the administrator and the user of the LAN.

In this way, log information is also monitored at the host server H side, resulting in security management being certainly conducted. Further, when a monitoring process, which cannot be operated by the security administration server S due to a restriction of such as process ability, can be conducted by the host server H, the log information may be more heavily monitored.

<Function Relating to Portable Telephone>

Figure 9:
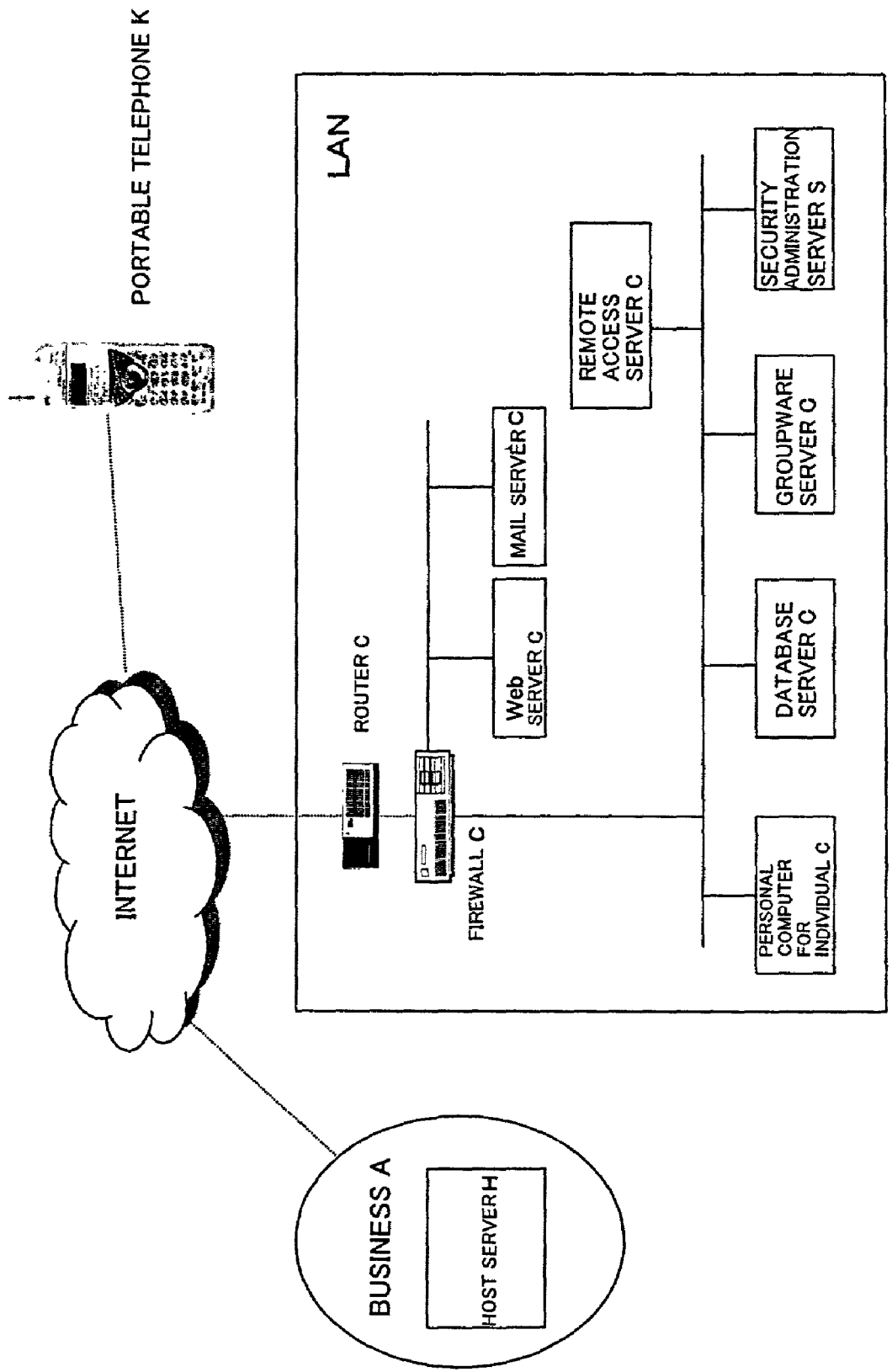
FIG. 9 is a diagram of a schematic network structure, showing a relationship of such as the LAN, the security administration server, the host server and the portable telephone according to an embodiment of the present invention.

As shown in FIG. 9, the host server H comprises a function to communicate with a portable telephone K via the Internet. When the host server detects an abnormality by the monitoring conducted by itself, it provides a service to notify of such effect and such content via the Internet, to the portable telephone K having a function to connect to the Internet. This service is, for example, provided to those who have already registered a phone number and a mail address of the portable telephone K. In this way, for example, the administrator of LAN or the user may be notified of the abnormality of the device to be monitored C in the LAN even when out of the office.

Further, the host server H has a function to receive an inquiry message of the log information sent from a portable telephone, to retrieve the log information accordingly, to edit such result to a predetermined image and send it to the portable telephone. The administrator of the LAN or the like may use this function to conduct, for example, a research or an analysis of the log information of the device to be monitored C even when outdoors, and thus a quick response becomes possible.

Further, the host server H receives information specifying the device to be monitored C operating in the LAN and a processing command to be executed by the device to be monitored C, which are sent from a predetermined portable telephone K via the Internet, and sends the processing command to the device to be monitored C via the Internet. Then, when the processing command is executed in the device to be monitored C, and the result of execution is sent from the device to be monitored C to the host server H, the host server H edits this result to an image with a form suitable for a user interface of the portable telephone K, and sends this to the portable telephone K. This processing is conducted by, for example, utilizing a function such as a remote control (for example, "telnet" in UNIX) between the host server H and the device to be monitored C.

Further, for example, when the OS of the device to be monitored C where the processing command is to be executed is UNIX, the processing command is such as, a "netstat" command for monitoring the connection condition of each device to be monitored C in the LAN, a "last" command for displaying the time of log-in and log-out of the user and a connecting computer, a "w" command for monitoring a user who is logged in and the command, a "df" command for displaying a usage situation of a disk capacity of a file system, a "top" command for displaying a system situation and a usage situation of a CPU, and a "syslog" command for examining a log situation.

With this function, such as the administrator of the LAN may use the portable telephone K by a familiar process command, and read the log information stored in the predetermined device to be monitored C.

<An Embodiment Utilizing Communication Packet>

Figure 10:
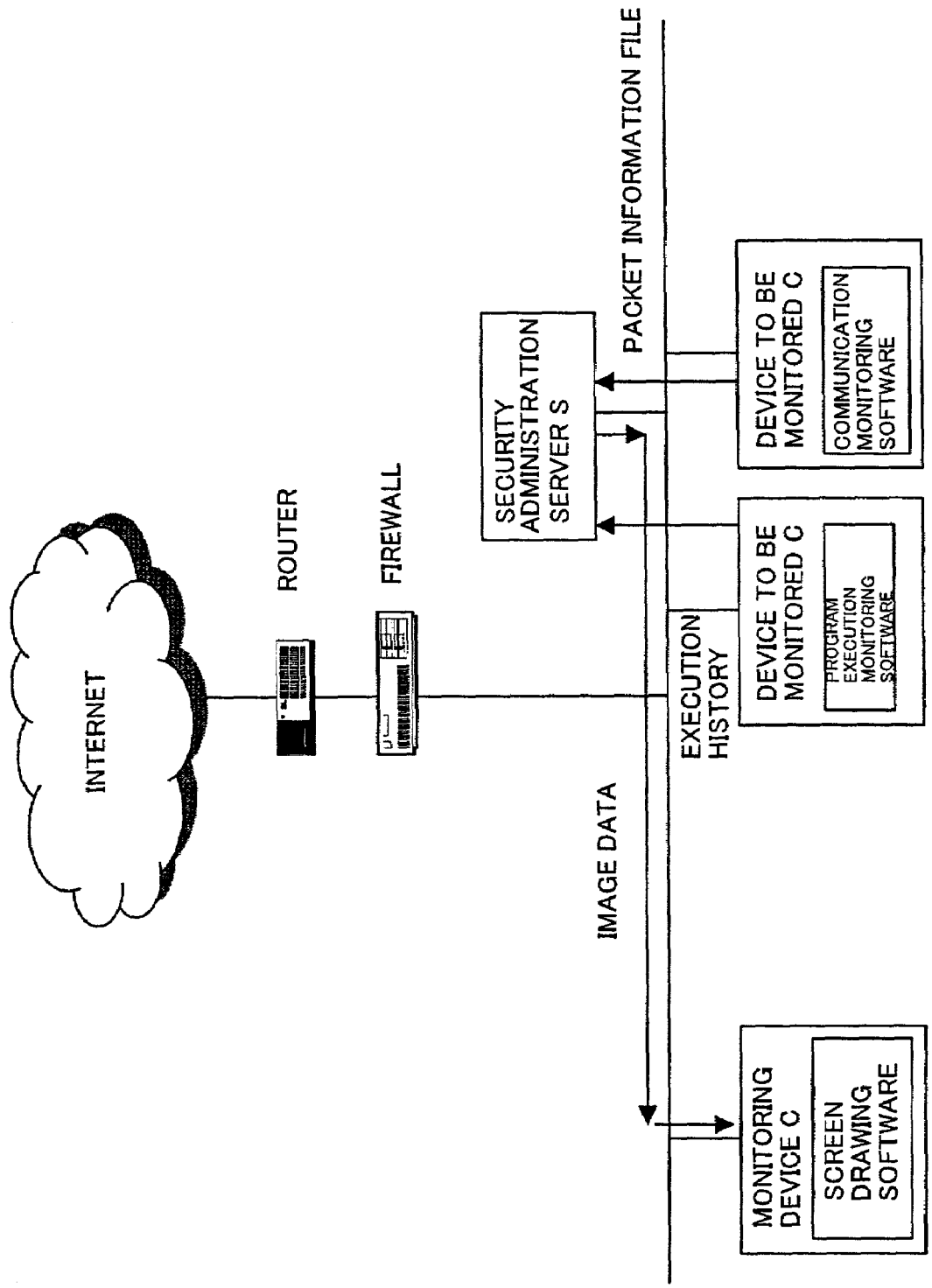
FIG. 10 is a diagram explaining a structure of the security administration server providing various images useful for security management by utilizing communication packets.

Incidentally, the structure explained as above utilized the log information, but the security administration server S also has a function to utilize the communication packets flowing in the LAN and provide various images useful for security management. FIG. 10 shows a schematic diagram of this structure.

Figure 11:
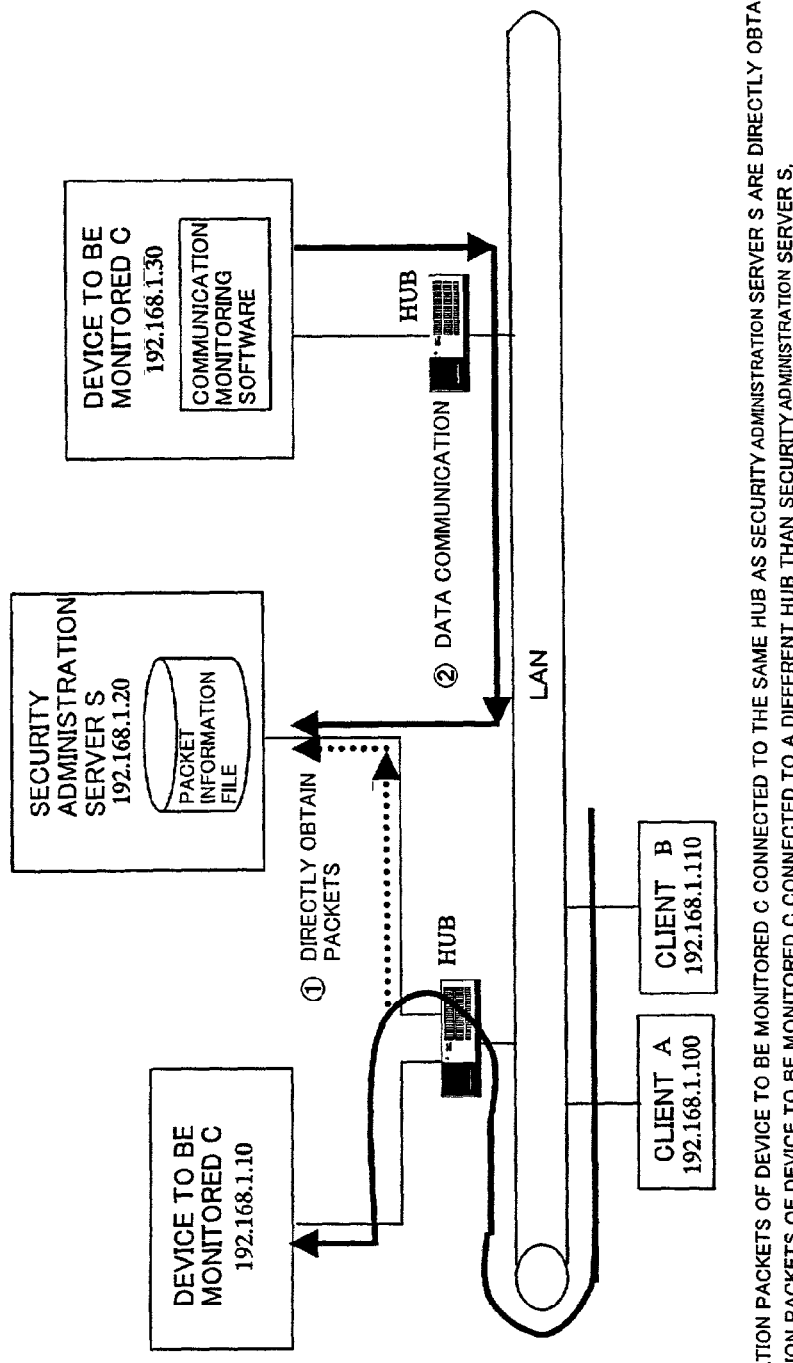
FIG. 11 is a diagram explaining a process of the security administration server obtaining the communication packets.

On the other hand, FIG. 11 shows a structure where the security administration server S obtains the communication packets in the above structure. The communication packets which are to be collected are, for example, those shown in Table 1, but the kinds of packet are not necessarily limited to the following.

TABLE 1

| Protocol | Monitoring protocol (port) | Monitoring command |
| --- | --- | --- |
| TCP | Windows NT/2000 domain | login |
|  | telnet | login/logout |
|  | ftp | login/close/quit |
|  |  | cd/lcd |
|  |  | get/put/delete/rmdir |
|  |  | (including multi) |
|  | pop3/imap4/apop | Command (USER-QUIT) |
|  |  | From/To/cc/bcc |
|  | smtp | From/To/cc/bcc |
|  | http | URL/ |
|  | rpc/rlogin/rsh/rcp/rexec | login/command |
|  | NetBIOS over TCP/IP | SMB |
|  | (File sharing/network printing) |  |
| NetBEUI | (File sharing/network printing) |  |

The security administration server S collects the communication packets flowing in the LAN by the following methods. For example, regarding communication packets transmitted and received by the device to be monitored C connected to a same hub as the security administration server S, they may be directly obtained by the server S itself and the server S directly obtains them (however, excluding a case where the hub which the security administration server S is connected to has an intelligent function like as a switching hub). On the other hand, when the server S itself is connected to a switching hub, or regarding communication packets transmitted and received by a device to be monitored C which is connected to a hub different from the hub the server S is connected to, the server S itself cannot directly obtain them. Regarding the communication packets, for example, a program to obtain the communication packets (communication monitor software) is operated at the device to be monitored C side, and with an effect from this program, the communication packets accumulated and stored in the device to be monitored C are concentrated to the security administration server S at a suitable timing via the LAN, to be obtained.

Note that, as a specific structure for the security administration server S to obtain communication packets in the device to be monitored C, for example, there is a method of sharing a file storing the communication packets in the device to be monitored C so that it may be referred to in the LAN, and referring this file from the security administration server S and copying it via the LAN. Further, for example, there is a method of transmitting a file storing the communication packets accumulated and stored in the device to be monitored C, to a security administration server S as data or a file via the LAN at a suitable timing. Note that, in either of these methods, the timing to collect the file recorded with the communication packets from each device to be monitored C, is suitably set according to such as the user's needs or the content of an image to be visualized, by specifying a date and time with a timer, collecting when the number or the size of data of the communication packets stored and managed in the device C has reached a certain amount, or the like.

The security administration server S stores and manages the communication packets collected as above, as a packet information file comprised of a data format shown in FIG. 12. On the other hand, the security administration server S suitably extracts preferable information for the visualization process from the packet information file, organizes such information for each device to be monitored C and generates a basic visualization data (packet log file) comprised of a data format shown in FIG. 13, and stores and manages this in a database. At the time of organizing the information for each device to be monitored C, it is necessary to specify, to which device to be monitored C the respective communication packets, included in the packet information file, belong to. The specifying is, for example, conducted by utilizing an IP address of a transmitter or a receiver of each communication packet. Note that, as explained in the above described "Function regarding DHCP", there is a case where the device to be monitored C cannot be uniquely specified from only an IP address, and in this case the device to be monitored C is specified as described above similarly also utilizing a MAC address written in the communication packets.

The security administration server S generates various images useful for security management in the LAN, based on the basic visualization data which is generated as described above and stored and managed in the database. Hereinbelow, specific examples of these images are introduced. Note that, these images generated by the security administration server S, are suitably provided to a monitoring device C operating in the LAN as images to be embedded in a Web page, and these images may be freely referred to by a user of each monitoring device C connected to the LAN (however, there may be an appropriate access restriction according to an operating policy of each LAN). In other words, each user may cooperatively perform security management in the LAN such as discovery of unjust events.

Figure 14:
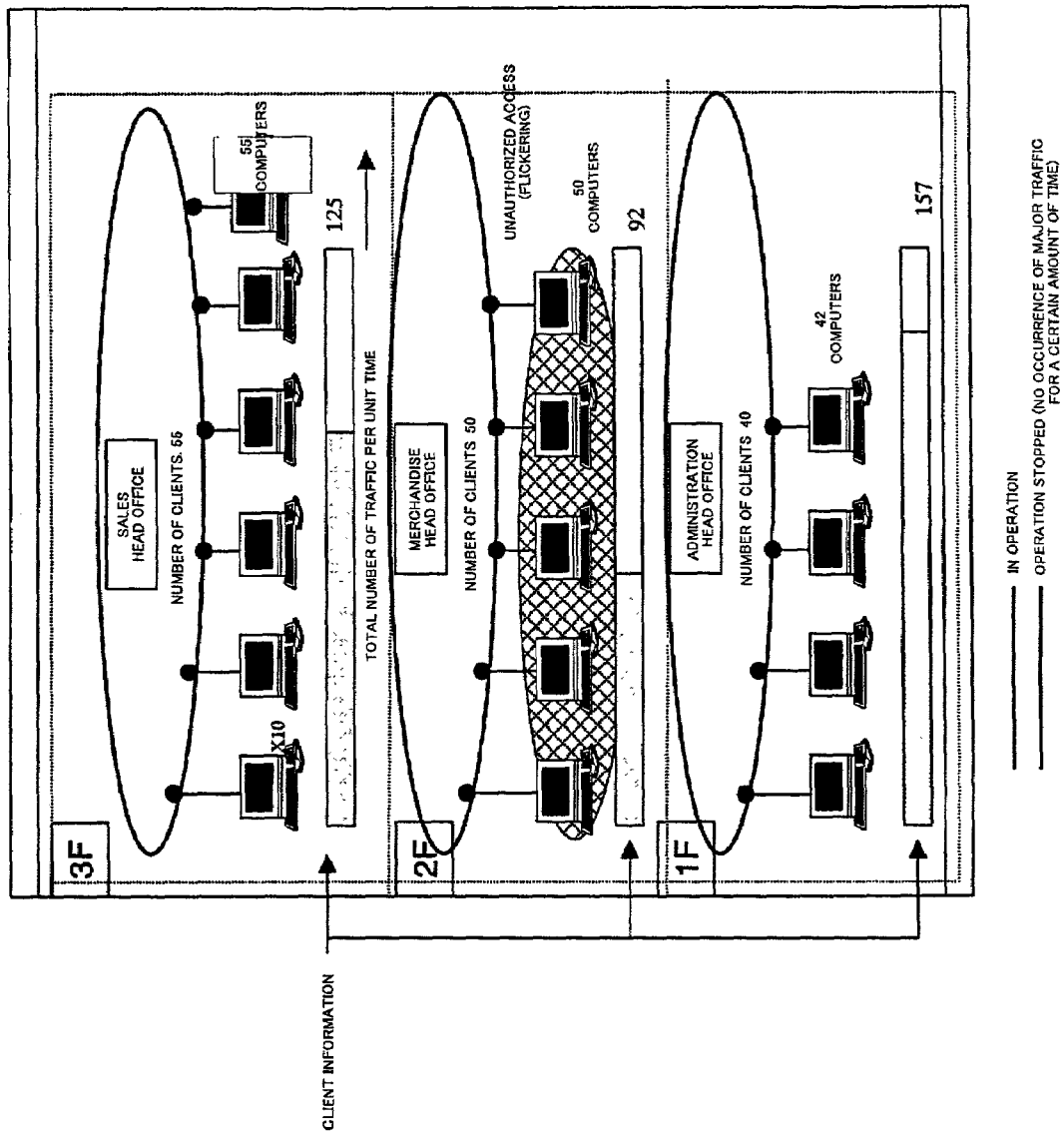
FIG. 14 is a diagram showing an example of an image based on a basic visualization data according to an embodiment of the present invention.

FIG. 14 shows an example of an image based on the basic visualization data. This image shows the state of a LAN installed in an office of a certain company. In the portions corresponding to each floor, the number of personal computers installed in each floor are shown by the number of the computer-shaped designs (in this example, one personal computer is drawn in respect to ten personal computers that are operating). Further, a bar graph showing the number of communication packets flowing in the LAN on each floor is displayed. Incidentally, statistical information such as the number of personal computers and the number of communication packets, are obtained by utilizing such as the packet collection time described in the basic visualization data. Note that, for generation of this diagram, information of the structure of the office building, for example, how many floors the building has, and information of such as the department names on each floor are necessary, and these information are registered in advance to the security administration server S by utilizing such as a Web page, by an administrator of the security administration server S or a user of the device to be monitored C.

On the other hand, the security administration server S monitors in real time, for example, whether a certain device to be monitored C in the LAN is accessed by a device to be monitored C which is not authorized access thereto, or whether a program operating in the device to be monitored C (or, a communication port number of TCP/UDP) or a database are accessed by a user who is not authorized the use (hereinbelow referred to as "unauthorized access"). When an unauthorized access is detected, for example, a portion of the floor installed with a device to be monitored C which has unauthorized access is displayed flickering with a pattern of a predetermined form.

Figure 15:
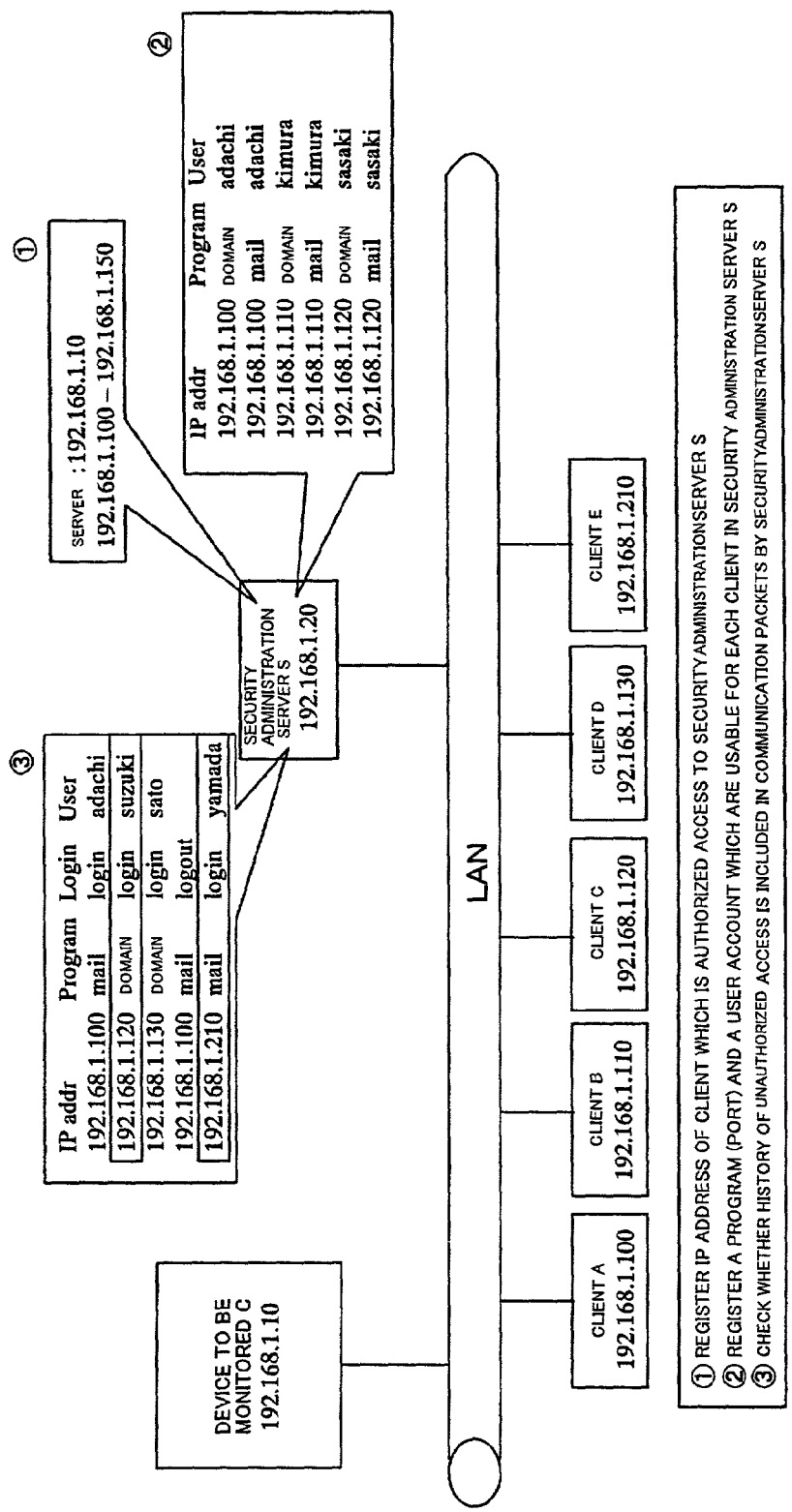
FIG. 15 is a diagram explaining a process of the security administration server monitoring an unauthorized access according to an embodiment of the present invention.

As shown in FIG. 15, the monitoring is performed by a method where, for example, a security administration server S stores and manages in advance an IP address of a device to be monitored C which authorizes access to each device to be monitored C as a limited-access information, in respect to each device to be monitored C, and then examines whether or not there exists in the basic visualization data of a certain device to be monitored C, an access history from a device to be monitored C having an IP address which is not authorized access to the device to be monitored C. Further, an examination of whether the program or database operating in the device to be monitored C is being accessed by a user who is not authorized the use is conducted by, for example, the security administration server S storing and managing in advance for every program or database operating in each device to be monitored C, a user ID which may use the program or database as access authorization information, and by examining whether or not there is no trace in the basic visualization data regarding a certain device to be monitored C that a program operating in the devices to be monitored C has been used by a user ID not authorized the use.

Figure 16:
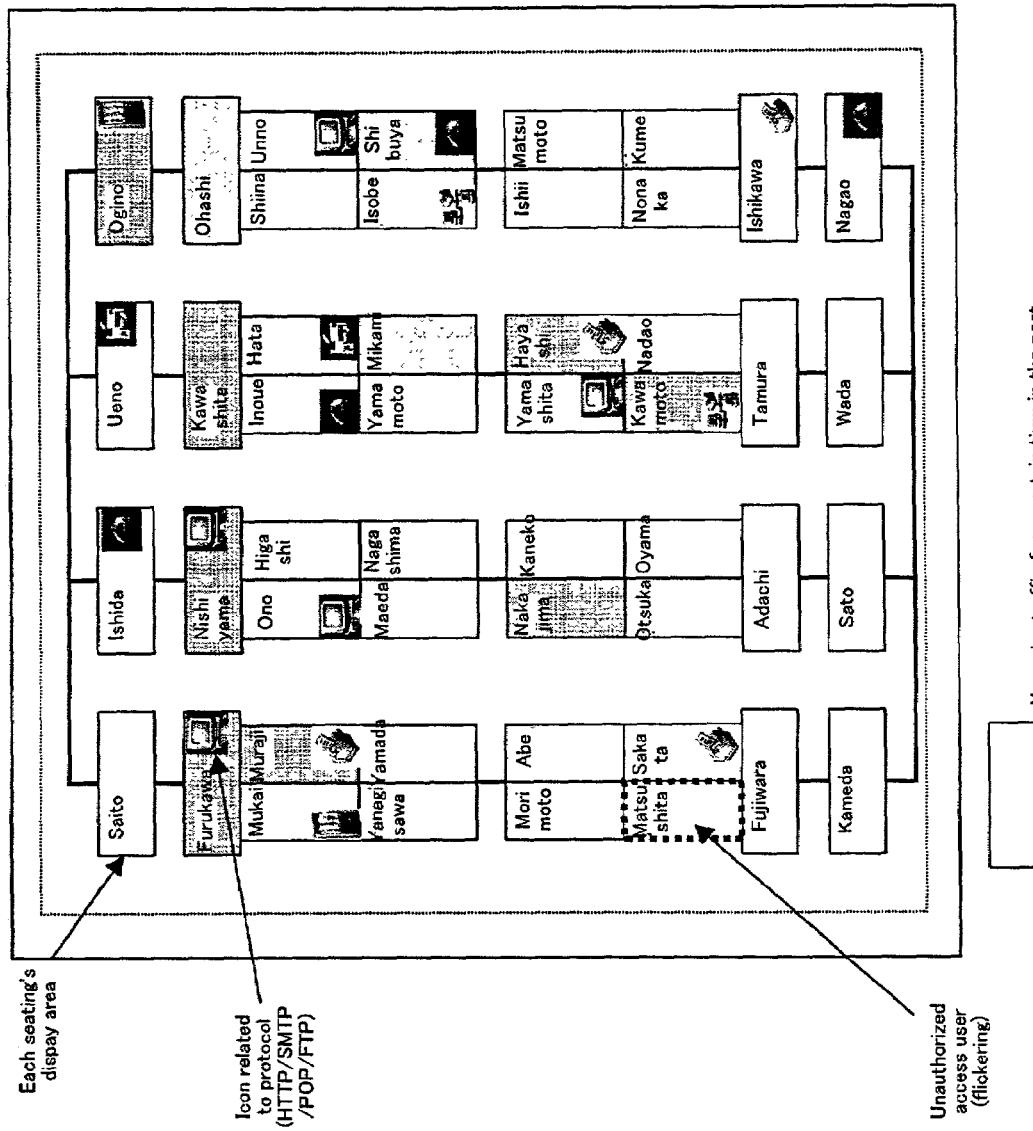
FIG. 16 is a diagram further showing an example of an image based on the basic visualization data according to an embodiment of the present invention.

FIG. 16 shows another example of an image based on the basic visualization data. This figure shows in more detail a use situation of the LAN on a certain floor in FIG. 14. In this image, images visualizing information such as, a communication state between each device to be monitored C in the LAN and a use situation of the users to each device to be monitored C which are generated based on the communication packets, and an access situation of each device to be monitored C or the user to the database operating in each device to be monitored C, are drawn with an abstract design of each device to be monitored C operating in the LAN as overlapping an image where each device to be monitored C is disposed in a configuration according to the actual arrangement state. Note that, this figure is appropriately displayed when, for example, such as the floor portion of FIG. 14 is clicked by a mouse. Information such as a layout of the seat and the user's name of the seat displayed in each seat portion, which is necessary for the image of FIG. 16, is registered in advance to the security administration server S by such as an administrator of the security administration server S, and a user of the respective devices to be monitored C in the LAN.

In each seat portion of the image in FIG. 16, an image is drawn to visually express by such as color classification or design (an icon shaped to correspond to a protocol which is in use, or the like), information such as what kind of protocol is used to conduct communication, and what system, program, and database are used, at present by the device to be monitored C installed in the seat. Further, both devices to be monitored C, which are the accessing side and the side to be accessed, are displayed with a same color so that the state of communication may be easily grasped. Further, an unauthorized access in the image of FIG. 16 as similar to the case of FIG. 14 is shown, and for example, when an unauthorized access is conducted regarding a certain device to be monitored C, the seat portion installed with the device to be monitored C is displayed flickering.

Figure 17:
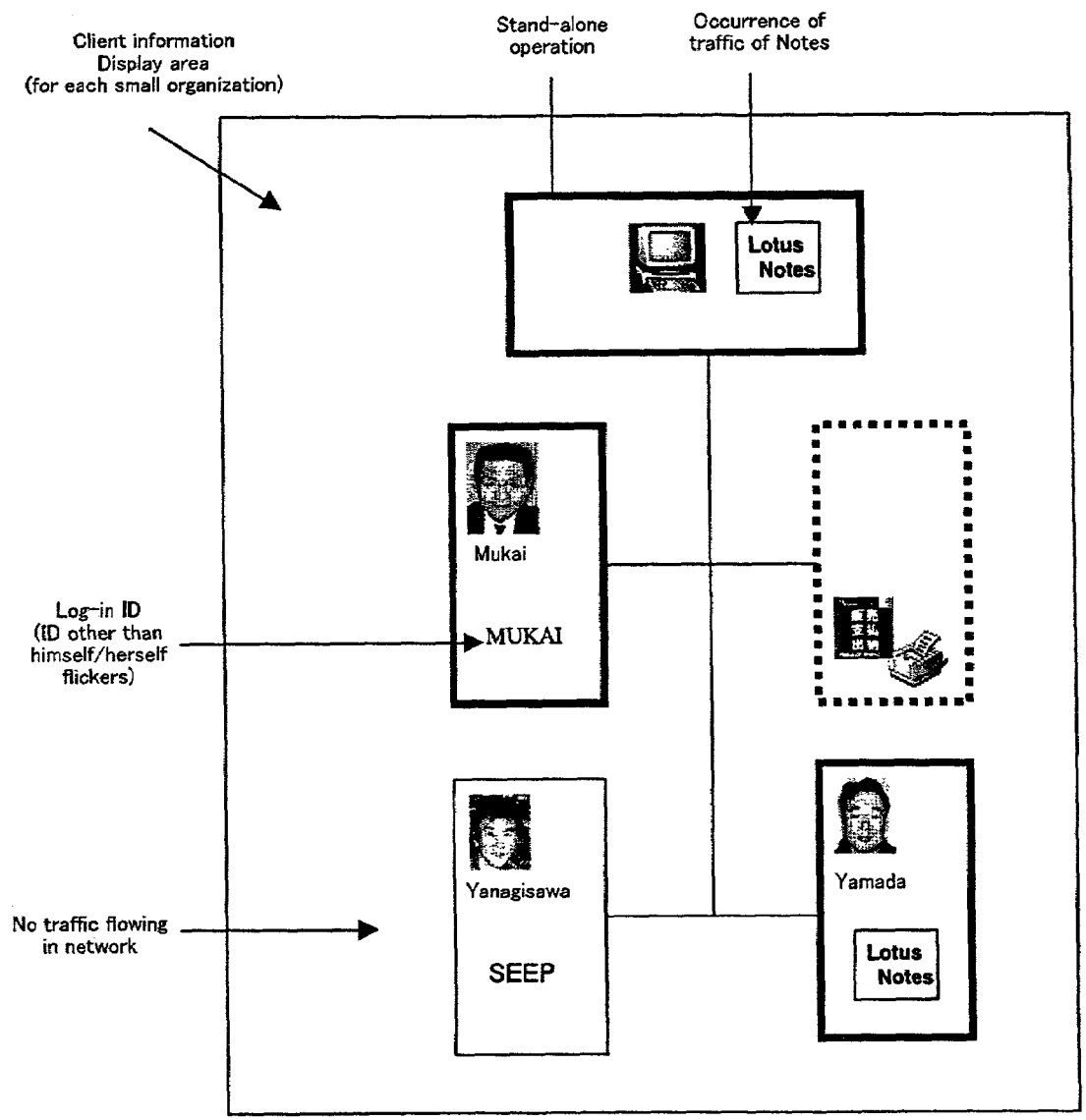
FIG. 17 is a diagram still further showing an example of an image based on the basic visualization data according to an embodiment of the present invention.

FIG. 17 is another example of an image based on a basic visualization data. This image is a close-up view of a portion of an image of FIG. 16, and includes more detailed information than FIG. 16, such as a user name or a photo of the face of a user using the device to be monitored C. Further, a state of an unauthorized access as similar to FIG. 16 is shown in this figure. Note that, this figure is displayed when, for example, a predetermined portion of FIG. 16 is clicked by a mouse.

Figure 18:
FIG. 18 is a diagram showing another example of an image based on the basic visualization data according to an embodiment of the present invention.

An image of FIG. 18 is displayed by such as clicking a portion of a certain seat of FIG. 17 with a mouse, and displays information regarding a device to be monitored C installed in a seat that is clicked (for example, an IP address allocated to the device to be monitored C) and information regarding a user of the device to be monitored C (for example, an electronic mail address of the user, a log-in history conducted by the user of the device to be monitored C to various systems and various servers by using the device to be monitored C, a use history of various shared network resources such as a printer, a use history by the user of the device C of a software operating in the device to be monitored C and updating history of various files). Note that, at the time of providing this image, an authorization process is suitably conducted to maintain security of each user.

Figure 19:
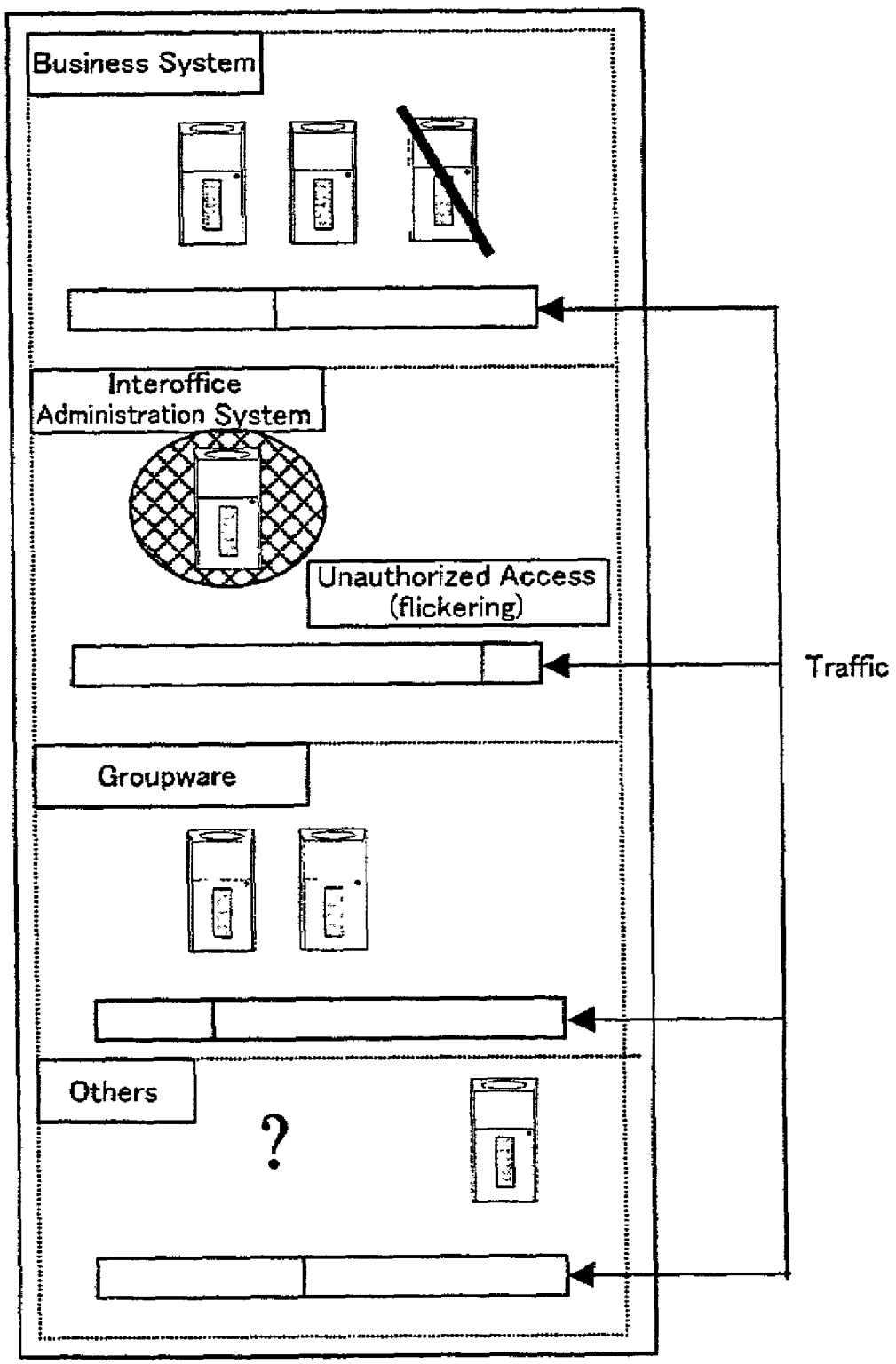
FIG. 19 is a diagram showing still another example of an image based on the basic visualization data according to an embodiment of the present invention.
Figure 20:
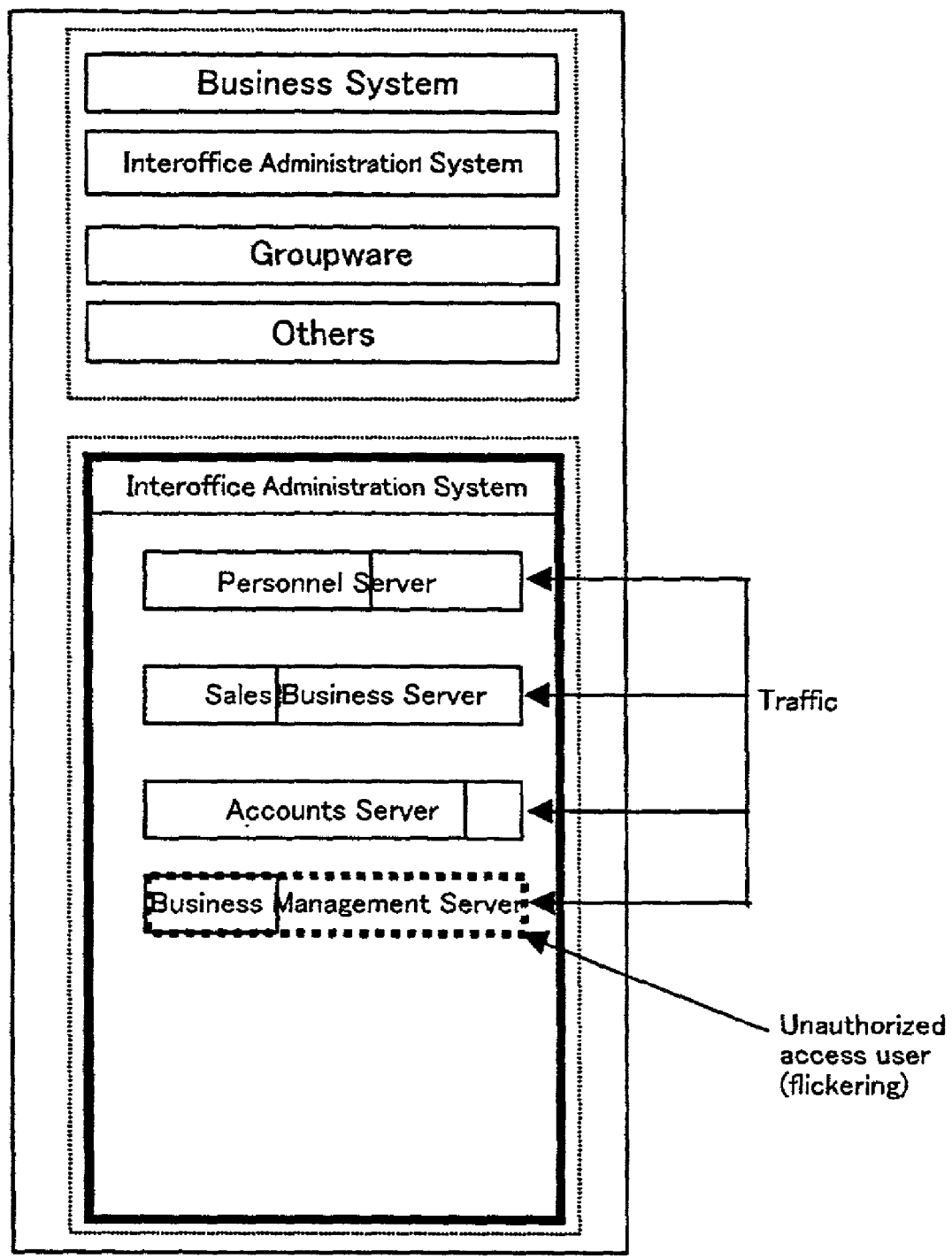
FIG. 20 is a diagram showing yet another example of an image based on the basic visualization data according to an embodiment of the present invention.
Figure 21:
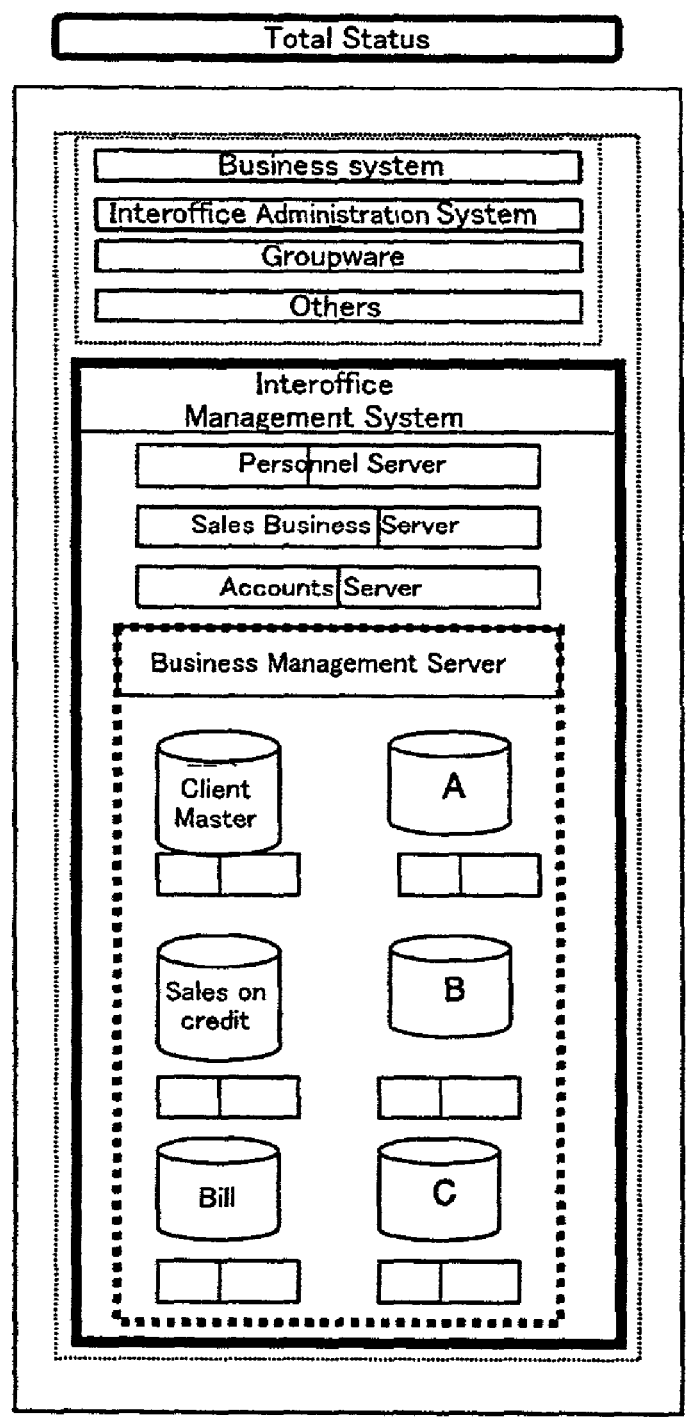
FIG. 21 is a diagram showing yet still another example of an image based on the basic visualization data according to an embodiment of the present invention.

FIGS. 19 to 21 show another example of an image based on a basic visualization data. In the image of FIG. 19 are displayed, an operating state of the devices to be monitored C in the LAN conducting application of each system such as, a business system, an interoffice management system, and a groupware, and an access frequency per unit time to these devices to be monitored C from other devices to be monitored C, which are classified into separate systems applied by using each device to be monitored C.

In the image of FIG. 20, there are displayed as bar graphs, access frequencies per unit time to the device to be monitored C which is conducting application of each system such as a business system, an interoffice management system, and a groupware. Note that, the access frequency is a total of the access frequency, in system units, to each server computer operating in each system, and is for example, calculated by totaling a number of communication packets for each unit time entering and exiting each server, based on the basic visualization data.

Figure 22:
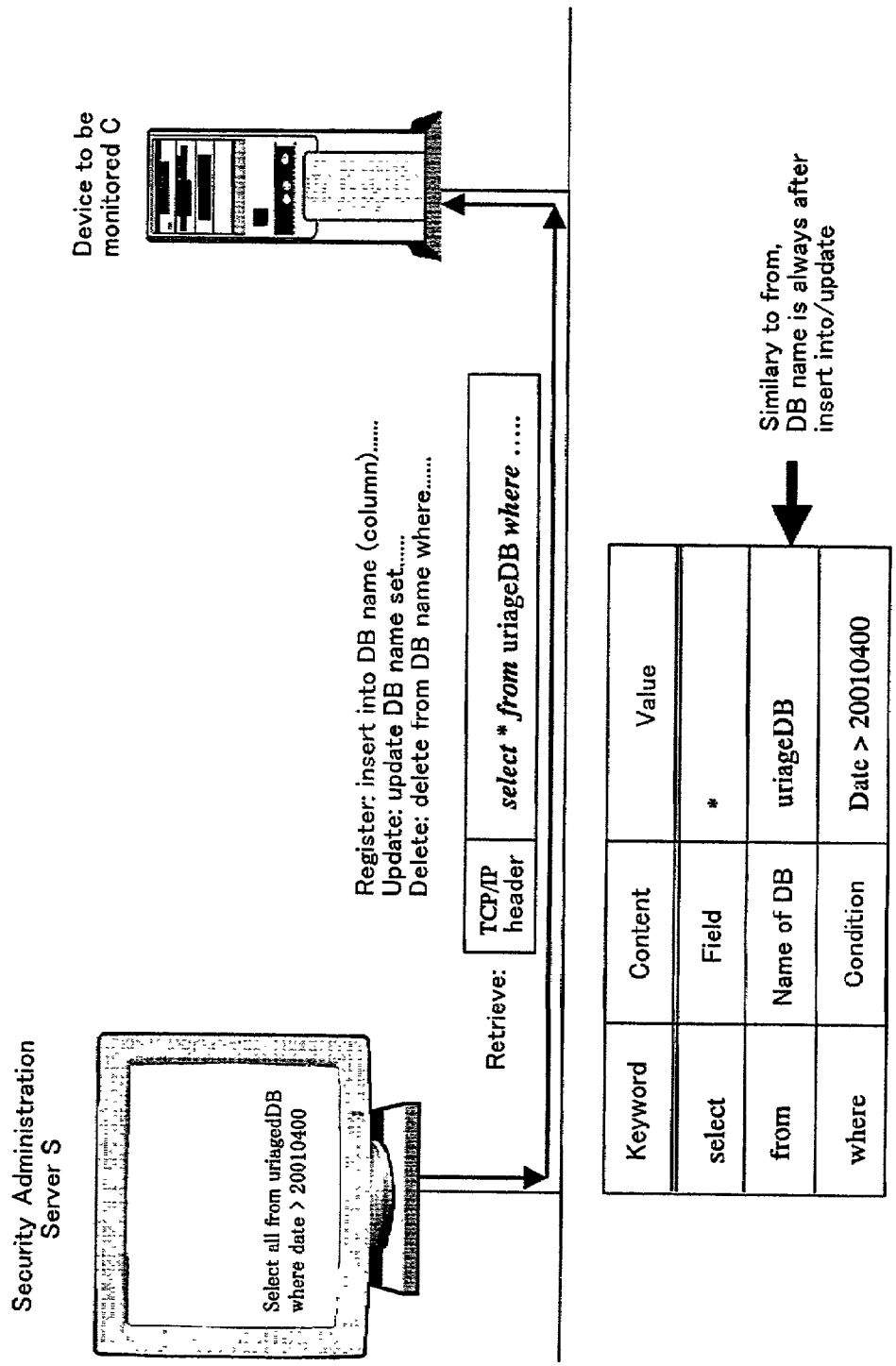
FIG. 22 is a diagram explaining a process specifying a database according to an embodiment of the present invention.

FIG. 21 displays a bar graph of the accessing frequency of each device to be monitored C operating in each system. Further, this diagram also shows the accessing frequency for each database operating in each device to be monitored C. This accessing frequency is calculated by a method of, for example, extracting the basic visualization data based on communication packets containing an SQL statement (FIG. 22), specifying a database such as a database name described in the basic visualization data, and totaling the appearance frequency for each specified database. Note that, the images of FIGS. 19 to 21 may be displayed individually, or may be displayed combined with the images of FIGS. 14, 16 and 17. Further, if there is an unauthorized access, such an event is shown by a predetermined form such as a flickering display in each image of FIGS. 19 to 21.

<Visualization of Program Execution History>

Incidentally, the security administration server S also has a function to generate an image useful for security management in the LAN based on an execution history of a program in the device to be monitored C, and to send this image to the monitoring device C. As shown in FIG. 10, the execution history in the device to be monitored C is generated by a program-execution monitor software which is resident and operating in the device to be monitored C. The program-execution monitor software detects that the program has been executed in the device to be monitored C, and accumulatively stores as execution history, a starting time and ending time of the execution of the program, a mail transmitting and receiving information, an operating information of a browser, a use state of a printer, and information such as a file name referred to by the program. Note that, the program-execution monitor software obtains these information by monitoring, for example, the various message information issued from the OS operating in the device to be monitored C when starting the program and when referring to files.

The security administration server S suitably collects the execution history from the device to be monitored C via the LAN and stores and manages these for every device to be monitored C, and generates an image visualizing the execution history to a form useful for security management in the LAN. Then, this image is suitably sent from the security administration server S to the monitor device C via the LAN, to be shown on such as a display in the monitor device C.

===Additional Points===

As described above, the log information is an extremely important and useful information in security management, and easily becomes an object of tampering, unjust deletion, and the like. Accordingly, it is necessary to perform its management as cautiously as possible. In the above embodiment, it is not mentioned whether or not a process such as an authentication process or encryption is performed at the time of transmitting and receiving log information, such as between the security administration server S and each device to be monitored C in the LAN, between the security administration server S and the host server H, and between a portable telephone K and a host server H, but at the time of such communications, an authentication process, encryption, and the like may be suitably performed.

As described above, the security administration server of the present invention which is installed in the LAN of an organization such as a company and functions therein, provides various functions of automatically collecting the log information of each device to be monitored operating in the LAN and the communication packets flowing in the LAN, extracting useful information for security management of the LAN from the collected log information and communication packets to generate an image which visualizes the information to a form which is easy for people to use, and sending the image to the monitoring device via the LAN.

Accordingly, the log information or the communication packets stored in each device to be monitored are automatically collected, and collection of such as the log information may be efficiently conducted. Further, information useful for security management is automatically extracted from such as the collected log information, and such information is provided as an image visualized to a form which is easy for people to use, thus labor is saved for operations such as researching and analyzing the log information than conventionally. Further, by this visualization, events that are valuable for security management which could not be noticed by just seeing the log file or the communication packet can be more easily found, and a more reliable security management may be performed.

Further, the image is provided to a monitoring device, for example such as a computer of an administrator or an individual's personal computer used for daily desk work, via the LAN, and as a result the users of various devices to be monitored operating in the LAN may conduct security management in the LAN cooperatively, and an advanced security management may be performed without an experienced or professional operator. Further, each user's mutual monitoring of security in the LAN, will function effectively as a preventive measure of so-called unjust acts by insiders, and the like.

Further, according to the abundant experience regarding detection or discovery, and countermeasures of unauthorized entry or the like which has been conventionally researched, the log information was provided to the user with the collected log information visualized to a state adapted as an unjust act such as unauthorized entry, so that an incredible amount of work like looking through each line in the log file was not compelled and an unjust act could be easily discovered.

Further, since the log information can be referred to from the portable telephone, for example, remote monitoring of the device to be monitored operating in the LAN when outside on a holiday or a business trip and the like becomes possible. Further, since the portable telephone is automatically notified of the abnormality of the device in the LAN, the administrator, the user or the like may be informed more promptly of abnormalities such as an unjust act in the LAN, thus suppressing the spread of the damage to a minimum.

It will be apparent to persons skilled in the art that other variations and modifications can be made to the arrangements described with respect to FIGS. 3 to 18 without departing from the scope of this invention.

What is claimed is:

1. A security administration server installed in a predetermined LAN, comprising:
    means for collecting information relating to a communication conducted via said LAN by a device to be monitored operating in said LAN;
    means for generating an image by extracting information useful for security management in said LAN from said collected communication related information and visualizing said information to a predetermined form;
    means for sending said image to a monitoring device wherein:
        said LAN is connected to an external network such as the Internet; and
        said image generating means comprises:
            means for generating an image visualizing into respective predetermined objects;
                said device to be monitored;
                a device operating in said external network which communicates with said device to be monitored;
                a user using said devices; and
                communication conducted between said device to be monitored and said device operating in said external network;
        said image generating means comprises a function for generating an image structured with an area displaying a text message as it is;
        an area displaying as a graph;
        an appearance frequency of a predetermined character string in said log information;
        an area displaying as a graph an appearance frequency of said character string for each predetermined unit time period in a time series; and
        an area displaying as a graph the length of each line of said text message, based on a log information structured with describing various processes conducted in each of said devices to be monitored in a text message format including such content and execution time and date in separate lines.

2. A security administration server as claimed in claim 1, wherein
    said device to be monitored comprises:
    means for managing a log file which is the entity of the log information in the form of an original file and a plurality of duplicate files thereof managed with the same contents as said original file in real time, and for storing and managing each file distributed to a plurality of storing places suitably defined in a storing means in said device to be monitored;
    means for suitably transferring each duplicate file to another said storing place;
    means for detecting whether or not there is an abnormality in security in both of said original and duplicate log files; and
    means for notifying said security administration server when an abnormality is detected of such fact and/or its content;
    wherein said image generating means comprises means for reflecting in said image a fact and/or its content of detecting said abnormality notified from said device to be monitored.

3. A security administration sever as claimed in any of claims 1 or 2, comprising:
    means for receiving an updating data sent from a predetermined computer operating in said external network; and
    means for updating a content of a software providing said image generating means by said updating data.

4. A security administration server as claimed in claim 3, comprising means for transmitting and receiving said log information to and from said computer by communicating with said predetermined computer operating in said external network.

5. A security administration server as claimed in claim 4, comprising:
    means for storing and managing various setting-registration information such as information of said device to be monitored from which said log information is collected, and information used and/or referred to by said image generating means; and
    means for transmitting and receiving said setting-registration information to and from said computer by communicating with said predetermined computer operating in said external network.

6. A security administration server as claimed in claim 5, comprising:
- means for detecting an abnormality in security of said device to be monitored or said security administration server itself, by communicating with a predetermined computer operating in said external network, based on said collected log information and log information of said security administration server stored and managed by itself; and
- means for transmitting and receiving to and from said computer when an abnormality is detected of such fact and/or its content.

7. A security administration server as claimed in claim 1 or 2, comprising:
- means for communicating based on a TCP/IP protocol with each device to be monitored;
- means for allocating predetermined IP addresses according to a request from each device to be monitored in said LAN as well as for storing and managing allocated histories describing histories of corresponding said IP addresses and MAC addresses of each device to be monitored;
- means for storing and managing said collected communication related information attached with an IP address specifying which said device to be monitored said communication related information concerns;
- means for handling said communication related information attached with IP addresses corresponded to a same MAC address in said allocated history, as a communication related information regarding the same said device to be monitored.

8. A security administration server as claimed in claim 7, comprising:
- means for mutually transmitting and receiving said allocated history to and from other security administration servers operating in said LAN; and
- means for managing, in an integrated manner, said allocated history in another security administration server that is received and said allocated history stored and managed by said server itself; and
- means for handling said communication related information attached with IP addresses corresponding to a same MAC address in respect to these allocated histories, as a communication related information regarding the same device to be monitored.

9. A security administration server as claimed in claim 7, comprising means for specifying a MAC address wherein each combination of a MAC address and an IP address described corresponding to said allocated history is attached with a valid period information of said IP address, said valid period information and a generated time and date of said communication related information recorded and attached to said collected communication related information are compared, and a MAC address corresponding to an IP address attached to said communication related information at said generated time and date is specified.

10. A host server functioning as said predetermined computer in claim 3, comprising means for suitably sending said updating data to said security administration server.

11. A host server functioning as said predetermined computer in claim 4, comprising means for storing and managing said communication related information sent from said security administration server.

12. A host server as claimed in claim 11, comprising means for sending said communication related information which is stored and managed to said security administration server.

13. A host server as claimed in claim 12 comprising:
- means for detecting an abnormality in security regarding said device to be monitored based on said communication related information which is stored and managed; and
- means for sending to a security administration server installed in a relevant LAN of the fact and/or its content when an abnormality is detected.

14. A host server as claimed in claim 13, comprising:
- means for receiving said various setting information sent from said security administration server, or the fact and/or its content of detecting said abnormality and for storing and managing such information.

15. A host server as claimed in claim 13, comprising:
- means for communicating with a portable telephone via the Internet or a telephone network; and
- means for reporting to a predetermined portable telephone by a voice call or an electronic mail, of the fact and/or its content when the host server itself detects an abnormality, or the fact and/or its content of detecting said abnormality sent from said security administration server.

16. A host server as claimed in claim 15, comprising:
- means for communicating with a portable telephone via the Internet;
- means for receiving an inquiry message regarding said communication related information sent from a predetermined portable telephone;
- means for retrieving said communication related information corresponding to said inquiry message from said communication related information which is stored and managed; and
- means for sending a message described with such retrieved result to said portable telephone.

17. A host server as claimed in claim 15 comprising:
- means for communicating with a portable telephone via the Internet;
- means for receiving information specifying said device to be monitored sent from a predetermined portable telephone and a processing command executed in said device;
- means for sending said processing command to a device specified by said specifying information via the Internet; and
- means for receiving an execution result of said processing command sent from said device, for editing said execution result to an image of a form suitable for a user interface of said portable telephone, and for sending such image to said portable telephone.

18. A security administration server as claimed in claim 1, comprising means for collecting communication packets, wherein said communication related information is communication packets flowing in said LAN.

19. A security administration server as claimed in claim 18, comprising means for directly obtaining said communication packets via said LAN.

20. A security administration server as claimed in claim 18, comprising means for concentrating via said LAN communication packets which are obtained by said device to be monitored operating in said LAN and stored and managed in said device to be monitored.

21. A security administration server as claimed in claim 18, comprising:
- means for calculating at least one portion of a value of the number of said devices to be monitored or a number totaling the number of devices into predetermined groups, a number of communication packets transmitted and received by said device to be monitored via said LAN, and a number totaling such number of communication packets in predetermined groups; and means for generating an image visually expressing a value of at least one portion of each calculated value and for sending said image to said device to e monitored which is connected to via said LAN.

22. A security administration server as claimed in claim 18, comprising:
means for storing and managing access-limitation information in respect to said device to be monitored;
means for monitoring unauthorized access violating said access-limitation information based on said communication packets; and
means for generating an image visually expressing the effect when recognizing said unauthorized access and sending said image to said monitor device.

23. A security administration server as claimed in claim 18, comprising:
means for storing and managing access authorization information for each system operating in said device to be monitored;
means for monitoring unauthorized access violating said access authorization information based on said communication packets;
means for generating an image expressing the fact of when an access violating said access authorization information is recognized; and
means for sending said image to said monitoring device.

24. A security administration server as claimed in claim 18 comprising means:
for generating an image by drawing an image visualizing communication conducted between each of said devices to be monitored or an access situation of a user of each device to be monitored based on said communication packets and an access situation from each device to be monitored or a user to a database operating in each device to be monitored, as overlapping an image where an abstract design of each device operating in said LAN is disposed to form according to an actual arrangement state of each device; and
for sending said image to said monitoring device.

25. A security administration server as claimed in claim 18, comprising means for detecting a use history of said device to be monitored of each user using said device to be monitored based on said communication packets and sending an image describing said use history to said monitoring device.

26. A security administration server as claimed in claim 18, comprising:
means for totaling the number of communication packets transmitted and received to and from said device to be monitored which is examined based on said communication packets, for each system operating in said device to be monitored;
means for generating an image visualizing said totaled value for each system; and
means for sending said image to said monitor device.

27. A security administration server as claimed in claim 18, comprising:
means for examining an operating state of said device to be monitored based on said communication packets;
means for generating an image visualizing an operating state of each device to be monitored by classifying into each system operated by using said device to be monitored; and
means for sending said image to said monitoring device.

28. A security administration server as claimed in claim 18, comprising:
means for detecting an access frequency to a database operated by said device to be monitored based on said communication packets;
means for generating an image visualizing by classifying for each device to be monitored or for each system operated by using said device to be monitored; and
means for sending said image to monitoring device.

29. A security administration server as claimed in claim 1, comprising:
means for collecting via the LAN execution histories of a program in said device to be monitored which is accumulated and recorded in said device to be monitored;
means for generating an image visualizing an execution history of a program in said device to be monitored based on said execution history; and
means for sending said image to said monitoring device.

30. A security administration server installed in a LAN connected to an external network such as the Internet, comprising:
means for passively or actively collecting a log information stored and managed by a device operating in said LAN;
means for generating an image visualizing information to a predetermined form, where said information is extracted as useful for security management in said LAN from said collected log information;
means for passively or actively sending said image to another device via said LAN; wherein:
said image generating means comprises means for generating an image visualizing as respective predetermined objects, said device operating in said LAN, a device operating in said external network communicating with said device, a user using both said devices, and communication conducted between said device to be monitored and said device operating in said external network;
said image generating means comprises a function for generating an image structured with an area displaying a text message as it is, an area displaying as a graph an appearance frequency of a predetermined character string in said log information, an area displaying as a graph an appearance frequency of said character string for each predetermined unit time period in a time series, and an area displaying as a graph the length of each line of said text message, based on a log information structured with various processes conducted in each device described in separate lines in a text message format including such content and executing time and date.

31. A security administration server as claimed in claim 30, wherein
said device operating in said LAN comprises:
means for managing a log file which is the entirety of the log information in the form of an original file and a plurality of duplicate files thereof managed with the same contents as said original file in real time; and
means for storing and managing each file distributed to a plurality of storing places suitable defined in a storing means in said device;
means for suitably transferring each duplicate file to another storing place;
means for detecting whether or not there is an abnormality in security in both of said original and duplicate log files; and wherein image generating means comprises means for reflecting in said image the fact an/or its content of detection of said abnormality notified from said device.

32. A security administration server as claimed in any of claims 30 to 31, comprising:
means for receiving an updating data sent from a predetermined computer operating in said external network; and
means for updating a content of a software providing said image generating means by said updating data.

33. A security administration server as claimed in claim 32, comprising means for transmitting and receiving actively or passively said collected log information to and from said computer by communicating with a predetermined computer operating in said external network.

34. A security administration server as claimed in claim 32, comprising:
means for storing and managing various selling-registration information such as information regarding said device operating in said LAN which is to be an object of collecting said log information and information used and referred to by said image generating means; and
means for transmitting and receiving said setting-registration information actively or passively to and from said computer by communicating with a predetermined computer operating in said external network.

35. A security administration server as claimed in claim 30 or 31, comprising:
means for detecting an abnormality in security of said device or said security administration server itself by communicating with a predetermined computer operating in said external network, based on said collected log information and a log information of said security administration server stored and managed by itself; and
means for transmitting and receiving actively or passively to and from said computer the fact and/or its content when an abnormality is detected.

36. A security administration server as claimed in claim 30 or 31, comprising:
means for communicating based on a TCP/IP protocol with each device in said LAN;
means for allocating predetermined IP addresses according to a request from said device in said LAN as well as for storing and managing allocated histories describing histories of corresponding said IP addresses and MAC addresses of said devices;
means for storing and managing said collected log information by attaching an IP address specifying which device said log information concerns;
means for handling said log information attached with IP addresses corresponded to a same MAC address in said allocated history, as log information regarding the same device.

37. A security administration server as claimed in claim 36, comprising:
means for mutually transmitting and receiving said allocated history to and from another security administration server operating in said LAN; and
means for integratedly managing in an integrated manner said receives allocated history in another security administration server, and said allocated history stored and managed by itself, and for handling said log information attached with IP addresses corresponding to a same MAC address in respect to said allocated histories, as a log information regarding the same device.

38. A security administration server as claimed in claim 36 comprising means for specifying a MAC address wherein each combination of MAC address and an IP address described corresponding to said allocated history is attached with a valid period information of said IP address, said valid period information and a generated time and date of said log information recorded attached to said collected log information are compared, and a MAC address corresponded with an IP address attached to said log information at said generated time and date is specified.

39. A host server functioning as said predetermined computer in claim 32, comprising means for suitably sending said updating data to said security administration server.

40. A host server functioning as said predetermined computer in claim 33, comprising means for storing and managing said log information sent from said security administration server.

41. A host server as claimed in claim 40, comprising means for sending actively or passively said log information which is stored and managed to said security administration server.

42. A host server as claimed in claim 41, comprising:
means for detecting an abnormality in security of said device in said LAN based on said log information which is stored and managed; and
means for sending to a security administration server installed in a relevant LAN the fact and/or its content when an abnormality is detected.

43. A host server as claimed in claim 42, comprising means for actively or passively receiving various setting information sent from said security administration server or the fact and/or its content of detecting said abnormality and from storing and managing such information.

44. A host server as claimed in claim 42, comprising:
means for communicating with a portable telephone via the Internet or a telephone network; and
means for reporting to a predetermined portable telephone by a voice call or an electronic mail, the fact and/or its content when the host server itself detects an abnormality or the fact and/or its content of detecting said abnormality sent from said security administration server.

45. A host server as claimed in claim 44, comprising:
means for communicating with a portable telephone via the Internet;
means for receiving an inquiry information regarding said log information sent from a predetermined portable telephone;
means for retrieving said log information corresponding to said inquiry message from said log information which is stored and managed; and
means for sending a message describing said retrieved result to said portable telephone.

46. A host server as claimed in claim 44, comprising:
means for communicating with a portable telephone via the Internet;
means for receiving information specifying said device operating in said LAN sent from a predetermined portable telephone and a processing command executed in said device;
means for sending said processing command to a device specified by said specifying information via the Internet;
means for receiving an execution result of said processing command sent from said device for editing said execution result to an image of a form suitable for a user interface of said portable telephone and for sending such image to said portable telephone.

47. A security administration server as claimed in claim 1, comprising:
   means for detecting an abnormality in security of said device to be monitored based on said communication related information, and
   means for making said image reflect information to that effect and/or its content when the abnormality is detected.

48. A security administration server as claimed in claim 1, comprising means for collecting log information via said LAN, wherein said communication related information is log information stored and managed in said device to be monitored.

49. A security administration server as claimed in claim 30 comprising:

means for detecting an abnormality in security of a device operating in said LAN based on said collected log information; and means for making said image reflect information to that effect and/or its content when the abnormality is detected.

* * * * *